US012488594B1

(12) United States Patent
Besson et al.

(10) Patent No.: US 12,488,594 B1
(45) Date of Patent: Dec. 2, 2025

(54) SYSTEMS AND METHODS FOR INGESTING DATA BASED ON PREDEFINED DRIVING SEQUENCES

(71) Applicant: Zoox, Inc., Foster City, CA (US)

(72) Inventors: Clement Besson, San Francisco, CA (US); Antonio Prioletti, Redwood City, CA (US); Deepan Subrahmanian Palguna, Santa Clara, CA (US); Eric Yan Tin Chu, San Jose, CA (US); Adam Kane Wiener, New York, NY (US); Andrew Glen Tsao, San Carlos, CA (US)

(73) Assignee: Zoox, Inc., Foster City, CA (US)

( * ) Notice: Subject to any disclaimer, the term of this patent is extended or adjusted under 35 U.S.C. 154(b) by 522 days.

(21) Appl. No.: 17/880,935

(22) Filed: Aug. 4, 2022

(51) Int. Cl.
*G06V 20/58* (2022.01)
*B60W 60/00* (2020.01)
*G06V 10/764* (2022.01)

(52) U.S. Cl.
CPC ......... *G06V 20/58* (2022.01); *B60W 60/0011* (2020.02); *G06V 10/764* (2022.01)

(58) Field of Classification Search
CPC .. G06V 20/58; G06V 10/764; B60W 60/0011
See application file for complete search history.

(56) References Cited

U.S. PATENT DOCUMENTS

| | | | |
|---|---|---|---|
| 9,134,426 B1 * | 9/2015 | Siris | G06N 5/04 |
| 9,933,781 B1 * | 4/2018 | Bando | B60W 10/20 |
| 10,976,744 B2 * | 4/2021 | Huai | B60W 50/0098 |
| 11,648,962 B1 * | 5/2023 | Crego | G08G 1/166 |
| | | | 701/26 |
| 12,325,449 B1 * | 6/2025 | Agarwal | B60W 30/0956 |
| 2002/0161497 A1 * | 10/2002 | Maeda | B60R 16/0315 |
| | | | 701/33.4 |
| 2017/0192423 A1 * | 7/2017 | Rust | G05D 1/0212 |
| 2018/0267538 A1 * | 9/2018 | Shum | B60W 30/09 |
| 2019/0064810 A1 * | 2/2019 | Jiang | G06V 20/56 |
| 2020/0231169 A1 * | 7/2020 | Weiss | B60K 35/26 |
| 2021/0403034 A1 * | 12/2021 | Lapin | B60W 60/0027 |
| 2022/0055641 A1 * | 2/2022 | Wolff | G06N 20/00 |
| 2022/0237960 A1 * | 7/2022 | Aiello | G07C 5/0808 |
| 2023/0108895 A1 * | 4/2023 | Bao | G07C 5/0808 |
| | | | 701/32.1 |
| 2023/0339462 A1 * | 10/2023 | Gochev | G05D 1/81 |
| 2024/0003704 A1 * | 1/2024 | Gyllenhammar | G01C 21/3807 |
| 2024/0086586 A1 * | 3/2024 | Tang | G06F 30/20 |
| 2024/0211647 A1 * | 6/2024 | Ashish | G06F 30/20 |

(Continued)

*Primary Examiner* — Wesley J Tucker
(74) *Attorney, Agent, or Firm* — Lee & Hayes, P.C.

(57) ABSTRACT

Techniques associated with ingesting data based on the catalog are discussed herein. In some examples, log data associated with a vehicle in an environment can be received. The log data can include at least one of location data, state data, or prediction data. A sequence of data can be identified as corresponding to a driving sequence based on a set of rules. An identification of the driving sequence involving the vehicle in the environment can be associated with the sequence of data in a database. An inquiry for retrieving the sequence of data or information associated with the driving sequence can be received. In response to the inquiry, the sequence of data or information associated with the driving sequence can be returned.

20 Claims, 8 Drawing Sheets

(56) References Cited

U.S. PATENT DOCUMENTS

| | | | | |
|---|---|---|---|---|
| 2024/0278799 | A1* | 8/2024 | B Venkataraman | B60W 60/00 |
| 2024/0348663 | A1* | 10/2024 | Crabtree | H04L 63/104 |
| 2024/0391485 | A1* | 11/2024 | Rosman | B60W 60/00 |

* cited by examiner

US 12,488,594 B1

SYSTEMS AND METHODS FOR INGESTING DATA BASED ON PREDEFINED DRIVING SEQUENCES

BACKGROUND

Autonomous vehicles are becoming more and more common. These vehicles may define and navigate along routes without the assistance of a human driver. Various systems have been developed to assist with testing, updating, and maintaining operational software and hardware of the autonomous vehicles to ensure safety and reliability prior to deployment of the vehicles.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1A:
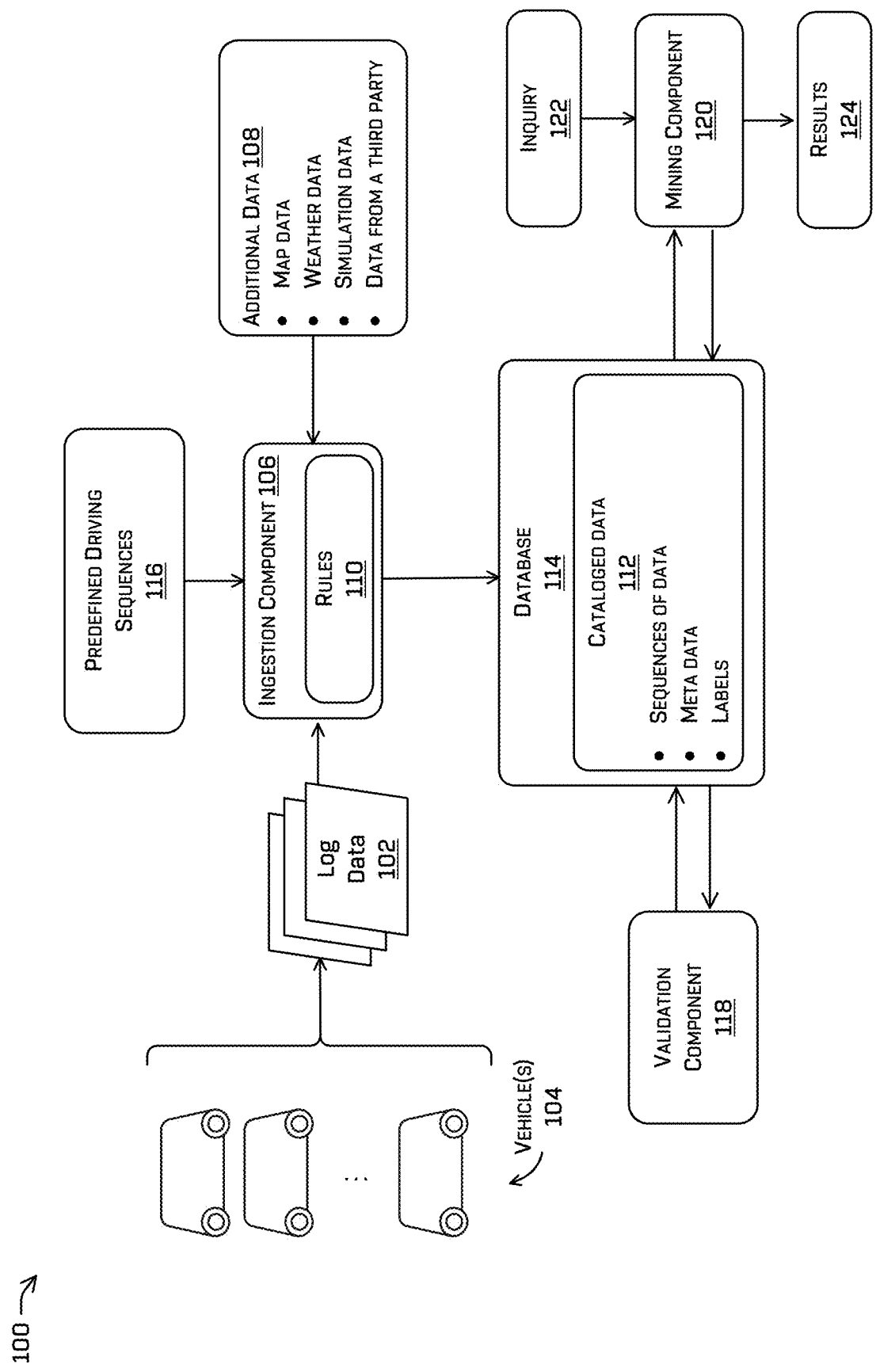
FIG. 1A illustrates an example of ingesting log data associated with one or more vehicles, in accordance with implementations of the disclosure.

Autonomous vehicles may navigate through physical environments along planned routes or paths. For example, when an autonomous vehicle receives a request to travel to a destination location, the autonomous vehicle may navigate along a planned path from the current location of the autonomous vehicle to a pickup location to pick up a passenger and then from the pickup location to the destination location. While navigating, the autonomous vehicle may encounter dynamic (e.g., vehicles, pedestrians, animals, and the like) and/or static (e.g., buildings, signage, parked vehicles, and the like) objects in the environment. In order to ensure the safety of the occupants in the vehicle and objects around the vehicle, different driving sequences can be associated with the log data collected and/or generated by the vehicle to generate cataloged data. Further analysis such as validating the vehicle behavior across various driving sequences can be conducted based on the cataloged data.

For example, a driving sequence may be any condition, event, sequence of events, confluence of events and/or conditions, or the like that can be described by geometric attribute associated with the object (e.g., a location of the object, or the like), a geometric attribute associated with the vehicle (e.g., a location of the vehicle, or the like), an environmental attribute (e.g., attributes of a road on which the vehicle is traveling, or the like), and/or a classification of the object (e.g., pedestrians, other vehicles, or the like). As described herein, the log data can include a series of ticks of data ordered in time, and an individual tick of data can be associated with one or more labels. In some examples, the sequence of data can include a combination of sub-sequences of data. A sub-sequence of data can include ticks of data associated with a first label of a geometric attribute associated with the object, a second label of a geometric attribute associated with the vehicle, a third label of an environmental attribute, a fourth label of a classification of the object, or the like. As described herein, the catalog can be one or more documents that include definitions of various driving sequences.

For instance, techniques described herein are directed to various aspects of the cataloging and mining of the log data based on the predetermined/predefined driving sequences. In at least some examples, the metrics associated with one or more driving sequences may be determined, for example, based on the cataloged data. In some instances, the cataloged data and the metrics can be used to validate software executed on vehicles and gather safety information to ensure that the software is able to safely control the autonomous vehicles in various driving sequences.

Techniques described here can include ingesting the log data based on a set of rules determined based on the predetermined/predefined driving sequences. As described herein, the catalog can define various driving sequences based on one or more parameters/attributes. In some examples, the one or more parameters/attributes can include a geometric attribute associated with the object, a geometric attribute associated with the vehicle, an environmental attribute, a classification of the object, and the like.

An ingestion component can receive log data associated with a vehicle traversing an environment. In some examples, the ingestion component can also, or alternatively, ingest simulation data generated by a simulation system. In some examples, the log data can include sensor data captured by one or more sensors of the vehicle, map data associated with the environment, perception data indicating objects identified by one or more systems onboard the vehicle (or produced during a post-processing phase), prediction data indicating an intent of objects (whether produced during the recording or subsequent thereto), and/or status data indicating diagnostic information, trajectory information, and other information generated by the vehicle. In some examples, the vehicle can transmit the log data, via a network, to the ingestion component.

The ingestion component can scan the log data to identify sequences of data as corresponding to driving sequences based on the set of rules. Then, the ingestion component can associate an identification of the driving sequence with the sequence of data (or with individual ticks or time-based segments of the sequence) in a database. In some instances, the driving sequence name can be defined/changed. In some examples, the database can be a local database of a computing device, an online database, a cloud database, etc. In some examples, the driving sequences (such as a driving sequence of "general bicycle handling in junctions," a driving sequence of "parking in an open space," a driving sequence of "big trucks proceeding through junction," and so on) can be defined in a catalog.

A mining component can receive an inquiry for retrieving data associated with one or more driving sequences and/or metrics. In response to receiving the inquiry, the mining component can query the database to locate the sequences of data associated with the one or more driving sequences. For example, the inquiry can request sequences of data associated with a driving sequence of "general bicycle handling in junctions." In response, the mining component can access the database to search for sequences of data associated with the driving sequence of "general bicycle handling in junctions." Then, the mining component can return the sequences of data.

In some examples, the mining component can access the database to search for similar driving sequences. For example, the inquiry can request the log data associated with the driving sequence that has a following agent. The mining component can search for sequences of data associated with driving sequences such as "the vehicle moving forward with an agent following the vehicle," "the vehicle changing lane to the right with an agent following the vehicle," or the like. As another example, the inquiry can request the log data associated with "lateral maneuvers." The mining component can search for sequences of data associated with driving sequences of "changing lane to the left," "changing lane to the right," "parking on the roadside," and the like. As another example, the inquiry can request the log data associated with "pick-up and drop-off (PUDO)." The mining component can search for sequences of data associated with driving sequences of "get on the road with no agents or objects around," "parking in a space with objects and parked cars nearby," "following an agent exiting a PUDO spot," and the like. Then, the minding component can return the search results.

The mining component can receive a metrics inquiry for retrieving metrics associated with the one or more driving sequences. In some instances, the metrics inquiry can request how often a driving sequence occurs, how many times a driving sequence occurs per mile, how a vehicle performs in the same driving sequence, the total number of non-traffic junctions the vehicle passes through, the total number of pedestrian tracks that the vehicle is yielding/cautioning to, the total number of stopped agents the vehicle passed by, the miles the vehicle drives through a driving sequence, how many miles a vehicle operates safely without incident, a ratio of a duration of the driving sequence to a whole duration the vehicle traversed, or a ratio of a number of miles associated with the driving sequence for the vehicle to a number of total miles traversed by the vehicle, etc. In response to receiving the metrics inquiry, the mining component can access the database to determine the metrics associated with the one or more driving sequences.

As a non-limiting example, the metrics inquiry can request metrics regarding how many times the first driving sequence of "general bicycle handling injunctions" occurs in the log data. The mining component can query the database to determine that 6 sequences of data 204 are associated with the first driving sequence of "general bicycle handling in junctions." As such, the metrics associated with the first driving sequence can be 6. Then, the mining component can return 6 as the metrics associated with the first driving sequence. In some examples, the mining component can search for metrics regarding a proportion, such as the time in the driving sequences that the criteria are active versus a total recorded time, a time of the driving sequences versus a total recorded time, a number of miles versus a total number of miles the vehicle traverses in the whole log data set, or the like.

As described above, a sequence of data can be associated with a driving sequence as defined in a catalog. In some examples, the sequence of data can be a combination of sub-sequences of data. A sub-sequence of data can include one or more ticks of data representing at least one attribute associated with the vehicle, the agent, or the environment. For example, a sub-sequence of data can represent a relative position of the vehicle and the agent, maneuver type, object type, junction type, time of day, day of week, or the like. Such a sub-sequence of data can be referred to as an "atomic" sequence and a combined sequence of data can be referred to as a "compound" sequence. In that sense, the "atomic" sequences can be combined to form a "compound" sequence. In some examples, a sub-sequence of data (atomic sequence) can be associated with one or more labels indicating vehicle maneuver, agent positions, junction types, time of day, day of week, etc. For example, a sub-sequence of data (atomic sequence) can be labeled as "vehicle moving forward" indicating that the vehicle maneuver is moving forward. As another example, a sub-sequence of data (atomic sequence) can be labeled as "bike," indicating that an object type is a bike. In some instances, the labels can be generated automatically and associated with the sub-sequences of data (atomic sequences). The sub-sequences of data can be put up together to generate a combined sequence of data (compound sequence).

An atomic sequence or segment may be determined based on an object classification label, a geometric label indicating a relative position between two objects or an object and a map feature (e.g., an intersection, train tracks, etc.), and/or an environmental label indicative of a feature in the environment. In some examples, a compound sequence can be determined based on a collection of concurrent labels and/or a sequence of specific labels occurring in an order or within a certain time period. A geometric label may indicate a relative position between an object in an environment and a vehicle (such as an autonomous vehicle as disclosed herein). The label may indicate if an object is in front of, to the left of, behind the vehicle, or any other relative direction/distance. Some geometric labels may similarly indicate that an object is a certain direction and/or distance from a map feature such as an intersection or a landmark or another object (e.g., that a vehicle is double parked next to another vehicle). In some examples, a label may indicate a status of an object (e.g., parked, moving, reversing, turning, not following traffic laws, running a light, etc.). In some examples, an environmental label may indicate an environmental feature such as the existence of a certain type of intersection, precipitation data, time of day information, season information, existence and/or state of a traffic light or sign, the existence of a construction zone or a school zone, etc. Separating atomic and compound sequences as disclosed herein enables automated labeling of many atomic features and automatic determination of compound features using the sequencing techniques disclosed.

A client computing device can have a user interface (UI), which can be configured to present information and facilitate integration with a user (such as an engineer). For example, the UI can present the sequence of data associated with one or more driving sequences and/or the metrics associated with one or more driving sequences. In some examples, the UI can receive inquiry input from the user. In some examples, the UI can present a catalog including the driving sequences in a configurable manner. In some examples, the UI can present the catalog with one or more selectable fields. The one or more selectable fields can include one or more options. The UI can receive a selection associated with the one or more selectable fields. In some examples, the client computing device(s) which includes the UI can update the catalog based at least in part on the selection. The client computing device(s) can send the updated catalog to the ingestion component. As such, a user (such as an engineer) can configure/refine the driving sequences and query the database for related log data.

As used herein, the sensor data may represent objects and/or conditions of the physical environment encountered by an operating vehicle. In some instances, the sensor data may include data captured by sensors such as time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The log data can include sensor data captured by one or more sensors of the vehicle, perception data indicating objects identified by one or more systems onboard the vehicle (or produced during a post-processing phase), prediction data indicating an intent of objects (whether produced during the recording or subsequent thereto), and/or status data indicating diagnostic information, trajectory information, and other information generated by the vehicle. The vehicle may transmit the log data, via a network, to a database that stores log data and/or to a computing device that analyzes the log data.

With the technique discussed herein, a user such as an engineer can efficiently query for log data relevant to one or more driving sequences and determine metrics associated with the one or more driving sequences. The catalog including the driving sequences can be updated to accommodate new driving sequences or to refine existing driving sequences. In some instances, analysis can be conducted by comparing metrics across geofences. In some instances, the behavior of a vehicle in various driving sequences (general driving, pedestrian handling, etc.) can be validated. In some instances, edge cases (e.g., rare driving sequences) can be mined from the log data using the catalog. Techniques described herein can be used to mine data for simulating, modeling, testing, and improving autonomous vehicle systems and developing software to assist overall operations of the autonomous vehicles when encountering various driving sequences. Techniques described herein can also be used to support a safety case for the vehicle, for example, to determine how many miles a version of the vehicle operates safely without incident.

FIG. 1A illustrates an example 100 of ingesting log data 102 associated with one or more vehicle(s) 104, in accordance with implementations of the disclosure. For the purpose of illustration, the vehicle(s) 104 can include one or more autonomous vehicles configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled.

The log data 102 can include information about the vehicle and information about an environment in which the vehicle is operating. In some examples, the log data 102 can include location data, state data, prediction data, and/or the like. As described herein, the log data 102 can include a series of ticks of data ordered in time. In some examples, a tick of data can be the measurement of data in time. In some examples, the location data can be data relating to geometry and can be characterized by lines and shapes.

In some instances, the log data 102 can include data captured and/or generated by the vehicle(s) 104 as the vehicle(s) 104 traverses an environment. In some examples, the vehicle(s) 104 can include sensors that can capture sensor data associated with the environment. In some instances, the sensor data can include data captured by sensors such as time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor data can be data captured by such sensors such as time-of-flight data, location data, lidar data, radar data, sonar data, image data, audio data, etc. For example, some of the sensor data can be associated with various objects (agents) such as dynamic objects (e.g., vehicles, cyclists, and/or pedestrians) and static objects (including, but not limited to, buildings, road surfaces, signage, barriers, etc.). The dynamic objects can be, as described above, objects that are associated with a movement (e.g., vehicles, motorcycles, cyclists, pedestrians, animals, etc.) or capable of a movement (e.g., parked vehicles, standing pedestrians, etc.) within the environment. The static objects can be objects that are associated with the environment (e.g., buildings/structures, road surfaces, road markers, signage, barriers, trees, sidewalks, etc.). In some instances, the vehicle(s) 104 can determine information about objects in the environment, such as bounding boxes, classifications, segmentation information, and the like. In some instances, the objects can also be referred to as agents.

The log data 102 can include vehicle data associated with the vehicle(s) 104, such as vehicle status data, velocity data, intent data, planning data, prediction data, and/or other data generated by the vehicle(s) 104. For example, the vehicle data can include, but are not limited to, current drive mode, current drive state, planned maneuver, total velocity, total acceleration, longitudinal acceleration, lateral acceleration, distance to an intersection, longitudinal acceleration, lateral acceleration, position data, coordinate data, orientation data, x-y-z coordinates, pitch, roll, yaw, yaw rate, Euclidian position, and the like.

The log data 102 can include intermediate output by any one or more systems or subsystems of the vehicle(s) 104 including, but not limited to, messages indicating object detections, object tracks, predictions of future object locations, pluralities of trajectories generated in response to such detections, control signals passed to one or more systems or subsystems used to effectuate commands, and the like. In some examples, the vehicle may be operating on the roadways and configured to capture sensor data associated with the environment as well as, in some cases, to process the sensor data to generate perception data and/or prediction data including, for example, data segmentation, object identification, classification, and predicted outcomes (e.g., motions, trajectories, etc.). For instance, details of classification and/or segmentation are discussed in U.S. application Ser. Nos. 16/238,475 and 16/732,243, which are herein incorporated by reference in their entirety for all purposes.

The log data 102 can include situational data associated with the environment, such as data released by a law enforcement agency, a department of motor vehicle, and/or a safety administration that can publish and/or store reports of activities and/or incidents. For example, the situational data can include traffic data, incidents data (e.g., a traffic hazard such as debris on a roadway, local flooding, etc.), road construction data, and the like.

The log data 102 can include metadata (e.g., timestamp metadata, descriptive metadata, structural metadata, and the like) that is associated with other data captured and/or generated by the vehicle. Timestamp metadata can include the time the data is created/generated, the time the data is modified, etc. Descriptive metadata can include information regarding who created the data, what the data is about, what the data includes, etc. Structural metadata can include information about the way data elements are organized, relationships between data elements, etc.

By way of example and without limitation, the vehicle(s) 104 can use a camera to capture image data while the vehicle is operating in the environment. In some instances, the image data can capture activity such as an incident. For example, as the vehicle is operating in the environment, an animal can run across the roadway and the vehicle can immediately brake to slow down or stop. The camera can capture image data of the animal running across the roadway and the vehicle slowing down. The image data can be included in the log data 102. As discussed above, metadata that is associated with the image data can be included in the log data 102.

Referring to FIG. 1A, the ingestion component 106 can receive the log data 102 and additional data 108. In some examples, the additional data 108 can include map data, simulation data, weather data (e.g., data regarding temperature, humidity, wind speed, rain or snow, sunny or cloudy, or the like), traffic data (e.g., data regarding traffic flow, traffic speed, traffic congestion, or the like), road construction data (e.g., data regarding the ongoing road construction, or the like), regulation data (e.g., data regarding speed limit, parking regulations, or the like), data provided by a third-party such as law enforcement agency, a department of motor vehicles, and/or a safety administration that can publish and/or store reports of activities and/or incidents, and the like.

The ingestion component 106 may include functionality to receive the log data 102 and associate the log data 102 with one or more driving sequences. The ingestion component 106 can run a set of rules 110 on the log data 102 to generate cataloged data 112. In some examples, the cataloged data 112 can be sequences of data with labels. The cataloged data 112 can be stored in database 114. In some examples, the database 114 can be a local database of a computing device, an online database, a cloud database, etc.

In some examples, the cataloged data 112 can include sequences of data, meta data, and labels. As described herein, the log data 102 can include a series of ticks of data ordered in time, and an individual tick of data can be associated with one or more labels to indicate attributes associated with the object, the vehicle, the environment, etc. In some examples, an individual tick of data can indicate at least one attribute such as relative positions of the vehicle and one or more agents or objects proximate to the vehicle, a maneuver type (e.g., a description or identification of what the vehicle is doing and/or of what the agent(s) is/are doing), an object type (e.g., a label or description of objects in the environment, including but not limited to pedestrian, vehicle, bicyclist), a description of the environment (e.g., a description or identification of a road attribute, like a junction type), or the like. A sequence of data can include one or more ticks of data in the series. The metadata can include descriptive data, time stamps, and other information associated with the log data 102. In some instances, the labels can be generated automatically and associated with the ticks of data in the time series of data. For example, a tick of data can indicate the presence of a pedestrian and can be associated with a label "pedestrian." As another example, a tick of data can indicate a maneuver of a left turn, and can be associated with a label "left turn." As another example, a tick of data can indicate an agent is following the vehicle, and such tick of data can be labeled as "following the vehicle." Accordingly, the ingestion component 106 can associate each tick of data with one or more labels or descriptors, and associate those labels with the data, e.g., as the cataloged data 112.

As described herein, a driving sequence can include the occurrence or presence of one or more events in a driving environment. Without limitation, a driving sequence can include such things as a vehicle speed exceeding a speed limit, a traffic light being red, a pedestrian crossing the road, an object blocking a lane, and the like. In some examples, the ingestion component 106 can scan the log data 102 for some events and then put the events together as a driving sequence. In some examples, the sequence of data can be a combination of sub-sequences of data. A sub-sequence of data can include one or more ticks of data representing at least one attribute associated with the vehicle, the agent, or the environment. For example, a sub-sequence of data can represent a relative position of the vehicle and the agent, maneuver type, object type, junction type, time of day, day of week, or the like. Such a sub-sequence of data can be referred to as an "atomic" sequence. For example, an atomic sequence "left-hand turn" can be determined based on a sequence of ticks that each indicates that the vehicle is turning left. Similarly, an atomic sequence "pedestrian crossing the street" can be determined based on a sequence of ticks that includes a "pedestrian" association and a changing relative position of the pedestrian.

Also in examples, a combined sequence of data can be referred to as a "compound" sequence. In that sense, the "atomic" sequences can be combined to form a "compound" sequence. In some examples, a sub-sequence of data (atomic sequence) can be associated with one or more labels indicating vehicle maneuver, agent positions, junction types, time of day, day of week, etc. For example, a sub-sequence of data (atomic sequence) can be labeled as "vehicle moving forward" indicating that the vehicle maneuver is moving forward. As another example, a sub-sequence of data (atomic sequence) can be labeled as "bike," indicating that an object in the environment is a bike. In some instances, the labels can be generated automatically and associated with the sub-sequences of data (atomic sequences). The sub-sequences of data can be put up together to generate the combined sequence of data (compound sequence). Additional details are given with respect to FIG. 1B.

A respective driving sequence can have a driving sequence name and can be defined by the one or more parameters/attributes. In some examples, the driving sequence name can be configured/changed. For example, the one or more parameters/attributes can include, but are not limited to, the day and time, whether the vehicle is in junction, a junction type, a number of lanes in the junction, a vehicle maneuver, a traffic control type, an agent type, a location of the agent (where is the agent), a relative position of the agent (relative to the vehicle), whether the agent is oncoming or ongoing, an agent maneuver, a state of an object, a position of the object relative to the vehicle, a state of the vehicle, a planned maneuver of the vehicle, a distance to an intersection, a lane identifier, a road identifier, and the like. In some examples, more parameters/attributes can be added to define a respective driving sequence.

A respective parameter can be selected from multiple options. For example, the parameter of day and time can be selected from Monday, Tuesday, Wednesday, Thursday, Friday, Saturday, Sunday, weekdays, from 7 AM to 7 PM, and the like. For example, the parameter of whether the vehicle is in junction can be selected from true, false, or either. For example, the parameter of junction type can be selected from a non-traffic light (NTLJ) junction, a traffic light (TLJ) junction, a first-in-first-out (FIFO) junction, an autonomous vehicle priority junction, an autonomous vehicle non-priority junction, a merge junction, and the like. For example, the parameter of the number of lanes in the junction can be selected from 2, 3, 4, and the like. For example, the parameter of a vehicle maneuver can be selected from moving forward, creeping, following, stopped, cruising, accelerating, decelerating, straight, nudging in lane, turning left, turning right, changing lane to the right, changing lane to the left, merging into highway, exiting highway, passing left, passing right, and the like. For example, the parameter of a traffic control type can be selected from a traffic light, a yield line, a stop line, a speed limit sign, a speed limit LED, and the like. For example, the parameter of agent type can be selected from a truck, a car, a bike, a pedestrian, a static object, a distractor, a pedestrian with an object, or no agent. For example, the parameter of location of the agent (where is the agent) can be selected from crosswalk, sidewalk, driveway, lane, shoulder, parking, a pick-up and drop-off (PUDO) spot, and the like. For example, the parameter of a relative position of the agent (relative to the vehicle) can be selected from front, left, right, behind, and the like. For example, the parameter of whether the agent is oncoming or ongoing can be selected from oncoming, ongoing, and the like. For example, the parameter of an agent maneuver can be selected from blocking junction, creeping, crossing, cutting in, cutting out, double parked, entering car, existing car, getting on road, jaywalking, k-turning, lane changing, loading, unloading, merging, moving forward, nudging in lane, parked, parking, passing left, passing right, stopped, turning left, turning right, and the like. In the above examples, crossing may refer to a maneuver where a vehicle/agent is within a certain time of entering a crosswalk. K-turning may refer to a maneuver of a vehicle/agent which turns around to face the opposite direction in a limited space, using forward and reverse movements. In some examples, there may be an option of "any" for the parameter, indicating that the parameter can be any option. In some examples, the parameter can be blank, indicating that this parameter is not limited.

The ingestion component 106 can scan the log data 102 to generate the cataloged data 112 based on the predefined driving sequences 116. In some examples, the predefined driving sequences 116 can define various driving sequences based on the one or more parameters/attributes, where the parameters/attributes can correspond to one or more labels.

As described herein, the predetermined driving sequences 116 can define an individual driving sequence based on various labels, such as a first label of a geometric attribute associated with the object, a second label of a geometric attribute associated with the vehicle, a third label of an environmental attribute, or a fourth label of a classification of the object, and/or the like. In some examples, an individual driving sequence (in the predefined driving sequences 116) can be determined based on a temporal order of one or more labels. For example, the predefined driving sequences 116 can be a collection of predefined driving sequences. In some examples, the predefined driving sequences are driving sequences that have already been defined, which can be used by the ingestion component 106 to identify a portion of the log data 102 that contains any of the predefined sequences.

As described herein, a driving sequence may be any condition, event, sequence of events, confluence of events and/or conditions, or the like that can be described by one or more attributes or parameters of the vehicle 104, one or more attributes or parameters of an environment of the vehicle (e.g., attributes of a road on which the vehicle 104 is traveling), and/or one or more attributes or parameters of an object in the environment of the vehicle 104 (e.g., attributes of nearby pedestrians, other vehicle on the road and/or the like). As a non-limiting example, the predefined driving sequences 116 can define a first driving sequence named "general bicycle handling in junctions" using the following parameters/attributes. For example, the parameter of day and time can be "weekdays from 7 am to 7 pm." The parameter of whether the vehicle is in the junction can be "true." The parameter of junction type can be "any." The parameter of the number of lanes in the junction can be "4." The parameter of the agent type can be "bikes." The parameter of location of the agent can be "lane." The parameter of maneuver of the vehicle can be "moving forward." The parameter of whether the agent can be oncoming or ongoing can be "oncoming." Other parameters/attributes can be "any" or blank. As another non-limiting example, the predefined driving sequences 116 can define a second driving sequence named "parking in an open space" using following parameters/attributes. For example, the parameter of whether the vehicle is in the junction can be "false." The parameter of junction type can be "any." The parameter of vehicle maneuver can be "parking." The parameter of the agent type can be "bikes." The parameter of agent type can be "no agent." Other parameters/attributes can be "any" or blank.

The ingestion component 106 can be configured to scan the log data 102 to identify one or more driving sequences represented in the log data 102, and associate sequences of data 102 with one or more driving sequences. For example, the ingestion component 106 can determine that a sequence of data 102 satisfies all the parameters/attributes of the first driving sequence (e.g., general bicycle handling injunctions). Then, the ingestion component 106 can label the sequence of data 102 as the first driving sequence (e.g., general bicycle handling in junctions). As another example, the ingestion component 106 can determine that a sequence of data 102 satisfies all the parameters/attributes of the second driving sequence (e.g., parking in an open space). Then, the ingestion component 106 can label the sequence of data 102 as the second driving sequence (e.g., parking in an open space). In some instances, the ingestion component 106 can store the sequences of data 102 with the associated labels as the cataloged data 112 in the database 114. The ingestion component 106 can also scan the log data 102 and identify other sequences of data 102 representing similar driving sequences and label the other sequences of the data 102 as the first driving sequence. In some instances, the ingestion component 106 can generate a library of driving sequences and store the library of driving sequences in the database 114.

The ingestion component 106 can use map data to label the log data 102. In some examples, the map data can include lane identifiers, road identifiers, segments of drivable regions of the environment, and the like. In some examples, the map data can include land boundary data of roads (e.g., streets, freeways, highways, bridges, or the like), buildings (e.g., houses, hotels, hospitals, offices, or the like), facilities (e.g., parking lots, gas stations, churches, libraries, or the like), green spaces (e.g., parks, gardens, woods, or the like), waters (e.g., rivers, lakes, seas, or the like), and the like. In some examples, the map data can include, but is not limited to, imagery data, terrain data, latitude and longitude coordinates, traffic data, or the like. In some examples, the map data can include geofences that represent virtual perimeters for real-world geographic areas in the environment that are compatible with the environment. In some examples, a geofence could be dynamically generated or match a predefined set of boundaries. In some examples, the map data can be used to determine whether the vehicle(s) 104 enter or exit a geofence. In some examples, the map data can include identifiers of segments of drivable surfaces of the environment. In some instances, a segment can include a junction segment (e.g., an intersection, a merge, or the like), a connecting road segment (e.g., a road between junctions), and the like. Techniques for identifying segments and similar segments of drivable surfaces and segment classifications and/or stereotypes can be found, for example, in U.S. patent application Ser. No. 16/370,696 titled "Extension of Autonomous Driving Functionality to New Regions" and filed Mar. 19, 2019, and in U.S. patent application Ser. No. 16/376,842 titled "Simulating Autonomous Driving Using Map Data and Driving Data" and filed Apr. 5, 2019, which are incorporated by reference herein in their entirety for all purposes.

The validation component 118 can validate the cataloged data 112. For example, a sequence of data may be associated with the first driving sequence. In some examples, the validation component 118 can receive an indication from an operator indicating whether the sequence of data belongs to a first driving sequence. In some examples, the validation component 118 can receive ground truth data and determine whether a sequence of data belongs to the first driving sequence based on the ground truth data. In some instances, the sequence of data validated by the validation component 118 can be labeled as validated, and the sequence of data denied by the validation component 118 can be labeled as denied.

The cataloged data 112 that include data associated with various driving sequences can be used to improve functionality of the autonomous vehicle. For example, by identifying the driving sequences in the log data 102, useful information can be collected, such as how often a certain driving sequence occurs, whether the autonomous vehicle performs as expected in the same or similar driving sequences, under which driving sequences the autonomous vehicle does not operate as it is supposed to, and the like. The cataloged data 112 can also be used to test/evaluate the autonomous vehicle in a simulated environment before the autonomous vehicle is exposed to a new environment. As such, techniques for controlling the autonomous vehicle over specific driving sequences can be optimized. The safety of the autonomous vehicles can be improved.

A mining component 120 can access the database 114 to retrieve or mine the cataloged data 112. In some examples, the mining component 120 can query the database 114 for log data associated with one or more driving sequences. In some examples, the mining component 120 can query the database 114 to determine metrics associated with one or more driving sequences. In some instances, the metrics can indicate how often a driving sequence occurs, how many times a driving sequence occurs per mile, how a vehicle performs in the same driving sequence, the total number of non-traffic junctions the vehicle passes through, the total number of pedestrian tracks that the vehicle is yielding/cautioning to, the total number of stopped agents the vehicle passed by, the miles the vehicle drives through a driving sequence, a ratio of a duration of the driving sequence to a whole duration the vehicle traversed, or a ratio of a number of miles associated with the driving sequence for the vehicle to a number of total miles traversed by the vehicle, etc. By way of example and without limitation, the metrics data can include pass/fail data signatures. For example, if at a stop sign the vehicle does not stop, the metrics data can indicate "failure." As another example, if at a stop sign the vehicle does stop, the metrics data can indicate "pass." For example, when the vehicle changes lanes, if the blinker does not blink, metrics data may indicate "failure." In at least some examples, the metrics data may be binary (failure or pass), coarse (levels of failure, e.g., "critical", "non-critical", and "pass"), or continuous (e.g., representing a probability of failure), though any other indication is contemplated. The metrics data is valuable because it can be used to validate whether the vehicle operates as expected in certain driving sequences. If the vehicle does not perform as expected, the engineer can improve the methods and systems for controlling the vehicle in terms of functionality, accuracy, etc. As such, the safety of the vehicle can be improved.

The mining component 120 can receive an inquiry 122 (e.g., from a user interface on a client computing device) requesting the log data associated with one or more driving sequences. For example, the mining component 120 can receive an inquiry 122 for the log data of a driving sequence of "general bicycle handling in junctions." The mining component 120 can search the database 114 to locate sequences of data in the log data 102 corresponding to the driving sequence of "general bicycle handling in junctions." Then, the mining component 120 can output/return the sequences of data associated with the driving sequence of "general bicycle handling in junctions" as the results 124. In some examples, the mining component 120 can receive an inquiry requesting metrics data associated with one or more driving sequences. For example, the mining component 120 can receive an inquiry requesting how many times the driving sequence of "big trucks proceeding through junction" occurs in the log data 102. The mining component 120 can query the database 114 to determine the number of sequences of data that correspond to the driving sequence of "big trucks proceeding through junction" and return the number as the results 124.

In some examples, the mining component 120 can output/return results including similar driving sequences. For example, the mining component 120 can receive an inquiry 122 for the log data of a driving sequence of "left turning of the vehicle." The mining component 120 can search the database 114 to identify sequences of data associated with "left turning of the vehicle with a pedestrian coming up," "left turning of the vehicle with an agent following," etc. Then, the mining component 120 can output/return the sequences of data associated with "left turning of the vehicle with a pedestrian coming up," "left turning of the vehicle with an agent following," as the results 124.

In some examples, the predefined driving sequences 116 can be configured/updated. For example, a user (such as an engineer) may refine the definition of one or more driving sequences by configuring/updating the one or more parameters/attributes associated with the one or more driving sequences. Additionally, the user can add one or more new driving sequences to the predefined driving sequences 116. The ingestion component 106 can scan the log data 102 again using the updated predefined driving sequences 116 to generate updated cataloged data. The ingestion component 106 can store the updated cataloged data in the database 114.

In some examples, with the systems and methods described here, a user such as an engineer can find edge cases by mining for driving sequences with the least exposure. Examples of such edge cases can include, but are not limited to, a driving sequence of "a child running into the street after a ball," a driving sequence of "a runner stopping to tie a shoe or tripping," a driving sequence of "cyclists not stopping for red lights or stop signs." Such edge cases may be rare, and finding the edge cases may require searching a large amount of log data.

In some examples, a user such as an engineer can compare metrics of the same driving sequence across geofences. For example, metrics can be obtained by querying the database regarding how often a large agent makes a right turn at a junction in a first geofence (e.g., Foster City) versus how often a large agent makes a right turn at a junction in a second geofence (e.g., Sacramento). For example, the user can define a first driving sequence of "a large agent making a right turn at a junction in first geofence" and a second driving sequence of "a large agent making a right turn at a junction in second geofence." For example, the first driving sequence and the second driving sequence can have the same parameters/attributes except that a parameter of geofence can be different. Then, the user can add the two driving sequences to the predefined driving sequences 116, and run the labeling of the log data, and search for the data associated with the first driving sequence and the second driving sequence.

Figure 1B:
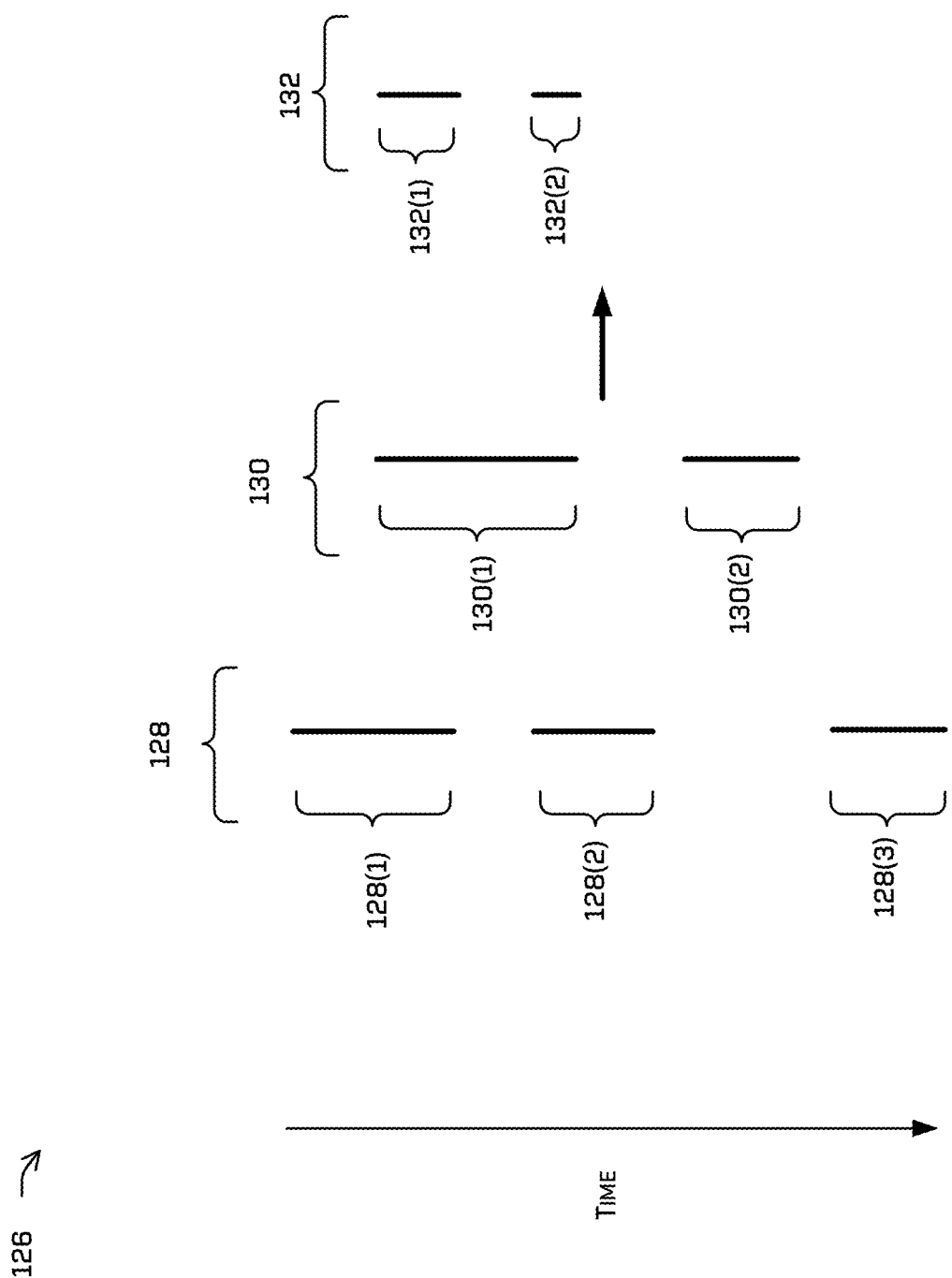
FIG. 1B illustrates an example of generating a combined sequence based on sub-sequences of log data 126 in accordance with implementations of the disclosure.

FIG. 1B illustrates an example of generating a combined sequence based on sub-sequences of log data 126 in accordance with implementations of the disclosure. As described herein, the log data can include a series of ticks of data ordered in time, and an individual tick of data can have one or more associated labels, e.g., as metadata stored as the cataloged data 112. In some examples, the ticks of data can include geometric data, classification data, and/or temporal data. In some examples, the ticks of data can represent a geometric attribute associated with the object, a geometric attribute associated with the vehicle, an environmental attribute, a classification of the object, and/or the like. For instance, a single tick of data can represent a perceived environment around a vehicle, as well as attributes of the vehicle, at a specific time. As described above, a sequence of data can be associated with a driving sequence defined in a catalog (e.g., the predefined driving sequences 116 described in FIG. 1A). In some examples, the sequence of data can be a combination of sub-sequences of data. A sub-sequence of data can include one or more ticks of data representing at least one attribute associated with the vehicle, the agent, or the environment. For example, a sub-sequence of data can represent a relative position of the vehicle and the agent, maneuver type, object type, junction type, time of day, day of week, or the like. Such a sub-sequence of data can be referred to as an "atomic" sequence and a combined sequence of data can be referred to as a "compound" sequence. In that sense, the "atomic" sequences can be combined to form a "compound" sequence. In some examples, a sub-sequence of data (atomic sequence) can be associated with one or more labels indicating vehicle maneuver, agent positions, junction types, time of day, day of week, etc. For example, a sub-sequence of data (atomic sequence) can be labeled as "vehicle moving forward" indicating that the vehicle maneuver is moving forward. As another example, a sub-sequence of data (atomic sequence) can be labeled as "bike," indicating that an object in an environment of the vehicle is a bike. In some instances, the labels can be generated automatically and associated with the sub-sequences of data (atomic sequences).

The sub-sequences of data can be combined to generate a combined sequence of data (compound sequence). In some examples, the combined sequence of data (compound sequence) can be labeled as (associated with) a driving sequence such as "general bicycle handling injunctions," "parking in an open space," or the like. As a non-limiting example, a combined sequence of data (compound sequence) can include a sub-sequence of data labeled as "bike" (e.g., a first atomic sequence), a sub-sequence of data labeled as "non-traffic light junction" (e.g., a second atomic sequence), a sub-sequence of data labeled as "vehicle moving forward" (e.g., a third atomic sequence), and the like. In some examples, because the combined sequence of data (compound sequence) satisfies the definition of the driving sequence "general bicycle handling in junctions" (as defined in predefined driving sequences 116 as described with respect to FIG. 1A), such a combined sequence of data (compound sequence) can be labeled as (associated with) the driving sequence of "general bicycle handling injunctions."

As shown in example FIG. 1B, a first sub-sequence, or a first atomic sequence, 128 and a second sub-sequence, or a second atomic sequence, 130 can be combined into a combined sequence, or compound sequence, 132. As an example, the first sub-sequence 128 can represent a first vehicle maneuver, and the second sub-sequence 130 can represent an agent attribute (e.g., position relative to the vehicle, action, classification, or the like). For example, the first sub-sequence 128 can include one or more first ticks of data 128(1) representing a first vehicle maneuver over a first time interval, one or more second ticks of data 128(2) representing the first vehicle maneuver over a second time interval, and one or more third ticks of data 128(3) representing the first vehicle maneuver over a third time interval. An individual tick of data of the one or more first ticks of data 128(1), the one or more second ticks of data 128(2), and the one or more third ticks of data 128(3) can be labeled as "first vehicle maneuver." For example, the second sub-sequence 130 can include one or more fourth ticks of data 130(1) representing a first agent attribute over a fourth time interval and one or more fifth ticks of data 130(2) representing the first agent attribute at a fifth time interval. An individual tick of data of the one or more fourth ticks of data 130(1) and the one or more fifth ticks of data 130(2) can be labeled as "first agent attribute."

In some examples, the first sub-sequence 128 and the second sub-sequence 130 can be combined into the combined sequence 132. Specifically, in the example of FIG. 1B, the compound sequence 132 may be defined (e.g., in the predefined driving sequences 116) as an occurrence of both the first sub-sequence (first atomic sequence) 128 and the second sub-sequence (second atomic sequence)130. In this example, the intersection of the first sub-sequence (first atomic sequence) 128 (e.g., as tagged in the cataloged data 112) and of the second sub-sequence (second atomic sequence) 130 (e.g., as tagged in the cataloged data 112), can be identified as the compound sequence 132. Stated differently, instances in time in which both the first sub-sequence (first atomic sequence) 128 and the second sub-sequence (second atomic sequence) 130 are present correspond to instances of the compound sequence 132. In the example of FIG. 1B, the overlap of the first time interval (associated with the tick(s) of data 128(1)) with the fourth time interval (associated with the tick(s) of data 130(1)) corresponds to one instance 132(1) of the compound sequence 132. Similarly, the overlap of the second time interval (associated with the tick(s) of data 128(2)) with the fourth time interval (associated with the tick(s) of data 130(1)) corresponds to another instance 132(2) of the compound sequence 132. As will be appreciated, because the fourth tick(s) of data 130(2) representative of the second sub-sequence (second atomic sequence) 130 do not overlap in time with any instances of the first sub-sequence (first atomic sequence) 128, no instance of the compound sequence is identified during the fifth time interval (associated with the fifth tick(s) of data 130(2)).

FIG. 1B conceptually illustrates example log data 126 where instances or ticks of log data (which can be similar to log data 102) that include both the first sub-sequence or attribute(s) and the second sub-sequence or attribute(s) also include the attribute(s) associated with the compound sequence 132. In implementations of this disclosure, the ingestion component 106 includes functionality to generate and associate tags with log data. In the example of FIG. 1B, the ingestion component 106 can associate a first tag with instances of the log data 126 that include the condition(s), attribute(s), or characteristic(s) defining the first sub-sequence (first atomic sequence) 128, and associate a second tag with instances of the log data 126 that include the condition(s), attribute(s), or characteristic(s) defining the second seb-sequence (second atomic sequence) 130. Then, any instances of the log data 126 that include both the first tag and the second tag are identified as corresponding to data associated with the compound sequence 132. In one non-limiting example, the sub-sequence (first atomic sequence) 128 can represent a first vehicle maneuver, e.g., a lane change, and the second sub-sequence (second atomic sequence) 130 can represent an object position or maneuver, e.g., a pedestrian proximate the vehicle. As detailed further herein, techniques according to this disclosure allow for ready identification of maneuvers, sequences, and driving scenarios, e.g., by facilitating identification of relatively complex sequences or driving scenarios from atomic or individual sequences, states, or the like.

Figure 2:
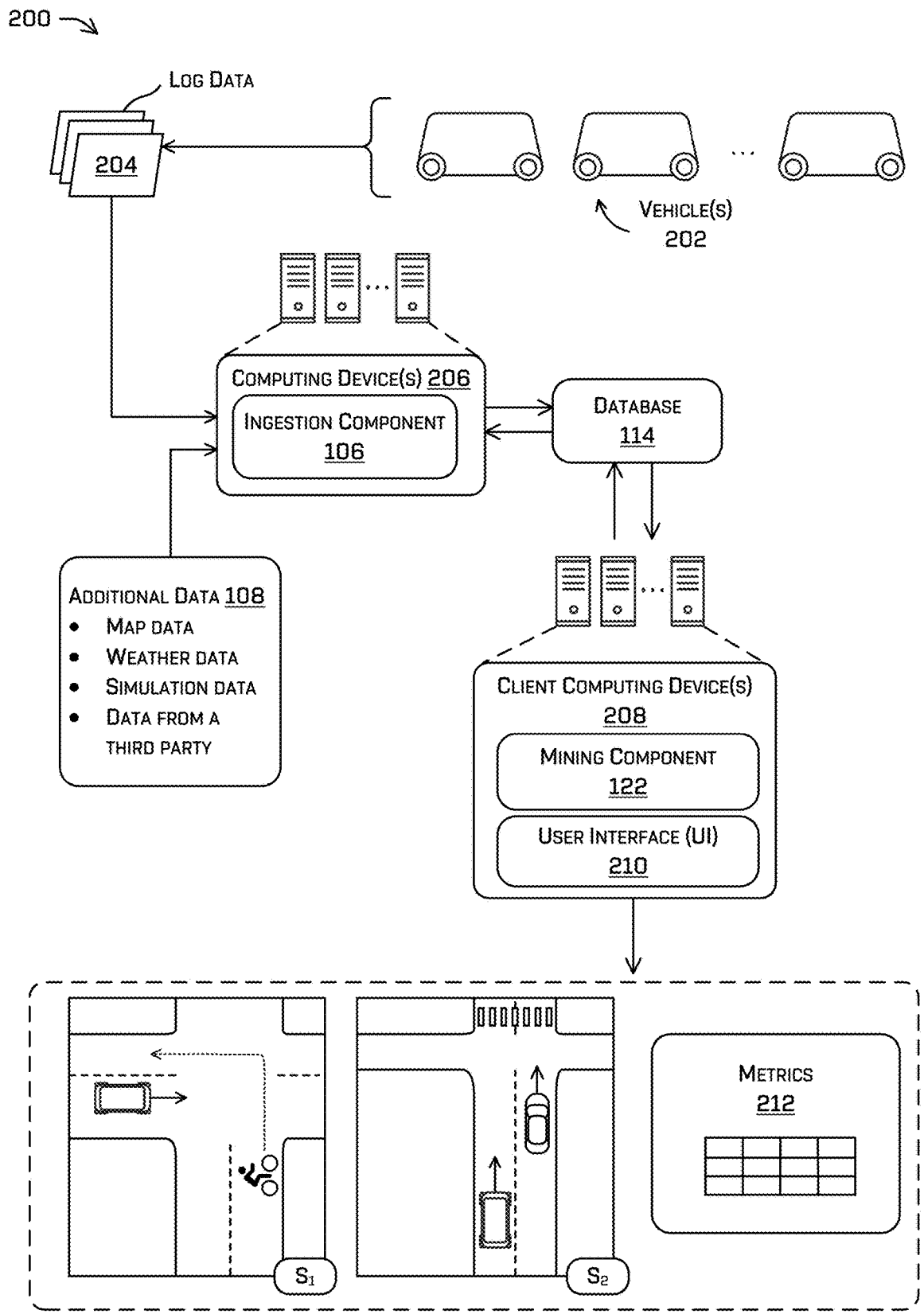
FIG. 2 illustrates an example of vehicle(s) generating log data and transmitting the log data to computing device(s), in accordance with implementations of the disclosure.

FIG. 2 illustrates an example 200 of vehicle(s) 202 generating log data 204 and transmitting the log data 204 to computing device(s) 206, in accordance with implementations of the disclosure. As discussed herein, the log data 204 can include sensor data captured by one or more sensors of the vehicle(s) 202, perception data indicating objects identified by one or more systems onboard the vehicle(s) 202 (or produced during a post processing phase), prediction data indicating an intent of objects (whether produced during the recording or subsequent thereto), and/or status data indicating diagnostic information, trajectory information, and other information generated by the vehicle.

The computing device(s) 206 can include the ingestion component 106 as described with respect to FIG. 1A. As discussed herein, the ingestion component 106 can receive the log data 204 and additional data 108 which can map data, simulation data, weather data, traffic data, road construction data, regulation data, data provided by a third party, and the like. In some examples, the ingestion component 106 may ingest and label the log data to generate the cataloged data to be stored in the database 114 as described with respect to FIG. 1A and FIG. 1B. In some instances, the ingestion component 106 can ingest the log data 204 at predetermined intervals of time, such as nightly and the like.

Client computing device(s) 208 can query the database 114. In some instances, the client computing device(s) 208 can include the mining component 120 as described above with reference to FIG. 1A and a user interface (UI) 210. In some examples, the UI 210 can be configured to receive an inquiry and present results in response to the inquiry. As described herein, the inquiry can request a sequence of data associated with one or more driving sequences, and/or information about the one or more driving sequences, such as metrics associated with the one or more driving sequences. For example, the UI 210 can receive an inquiry requesting sequences of data in the log data 204 that is associated with a first driving sequence of "general bicycle handling in junctions." In response to receiving the inquiry, the mining component 120 can query the database 114 to locate sequences of data associated with a first driving sequence of "general bicycle handling in junctions," and return the sequences of data that are associated with the first driving sequence of "general bicycle handling in junctions" as the result.

As another non-limiting example, the UI 210 can receive an inquiry requesting metrics regarding how many times the first driving sequence of "general bicycle handling in junctions" occurs in the log data 204. The mining component 120 can query the database 114 to determine how many sequences of data in the log data 204 are associated with the first driving sequence of "general bicycle handling in junctions," and return the number as the metrics. In some instances, the metrics inquiry can request how often a driving sequence occurs, how many times a driving sequence occurs per mile, how a vehicle performs in the same driving sequence, the total number of non-traffic junctions the vehicle passes through, the total number of pedestrian tracks that the vehicle is yielding/cautioning to, the total number of stopped agents the vehicle passed by, the miles the vehicle drives through a driving sequence, how many miles a vehicle operates safely without incident, a ratio of a duration of the driving sequence to a whole duration the vehicle traversed, or a ratio of a number of miles associated with the driving sequence for the vehicle to a number of total miles traversed by the vehicle, etc. In response to receiving the metrics inquiry, the mining component can access the database to determine the metrics associated with the one or more driving sequences.

In some instances, client computing device(s) 208 can present the results via the UI 210. For example, the UI 210 can present the sequences of data associated with the first driving sequence S1 of "general bicycle handling in junctions" and the sequences of data associated with the second driving sequence S2 of "agent passing by" in a visualized manner. Techniques of generating driving sequences based on log data are discussed in U.S. application Ser. No. 16/866,715, titled "System for Generating Generalized Simulation Scenarios," which is herein incorporated by reference in its entirety for all purposes. Examples of scenario simulation can be found, for example, in U.S. patent application Ser. No. 16/392,094 titled "Scenario Editor and Simulator" and filed Apr. 23, 2019 which is incorporated by reference in its entirety for all purposes.

In some examples, the UI 210 can present metrics 212. As detailed herein, metrics may be how often a driving sequence occurs, how many times a driving sequence occurs per mile, how a vehicle performs in the same driving sequence, the total number of non-traffic junctions the vehicle passes through, the total number of pedestrian tracks that the vehicle is yielding/cautioning to, the total number of stopped agents the vehicle passed by, the miles the vehicle drives through a driving sequence, how many miles a vehicle operates safely without incident, a ratio of a duration of the driving sequence to a whole duration the vehicle traversed, or a ratio of a number of miles associated with the driving sequence for the vehicle to a number of total miles traversed by the vehicle, etc. In response to receiving the metrics inquiry, the mining component can access the database to determine the metrics associated with the one or more driving sequences, etc.

Figure 3:
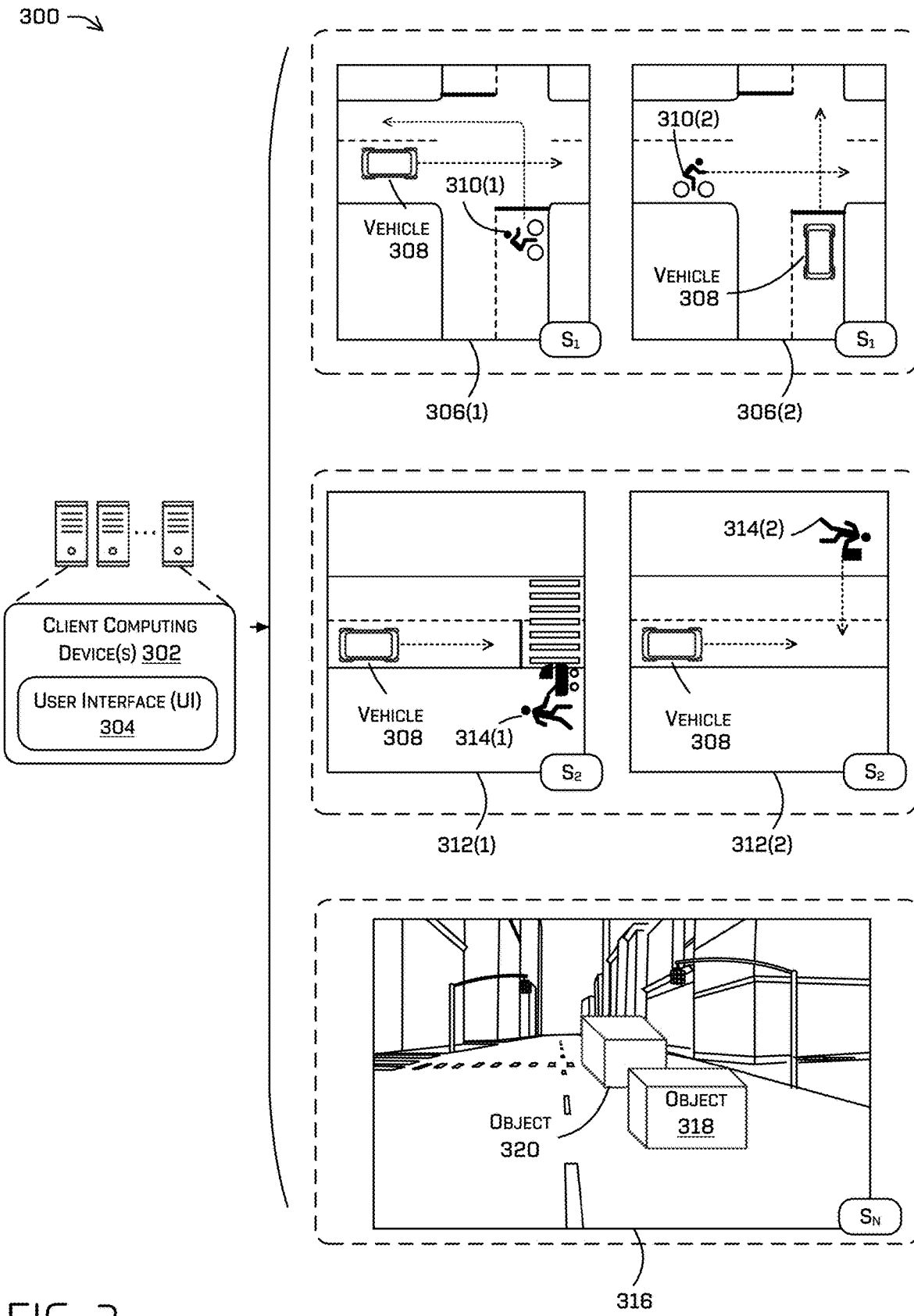
FIG. 3 illustrates an example where client computing device(s) can present various driving sequences via a user interface (UI), in accordance with implementations of the disclosure.

FIG. 3 illustrates an example 300 where client computing device(s) 302 can present various driving sequences via a user interface (UI) 304, in accordance with implementations of the disclosure. As described above, one or more sequences of data can be associated with the same driving sequence. For example, the first sequence of data and the second sequence of data can be associated with the first driving sequence S1 of "general bicycle handling in junctions." As a non-limiting example, the client computing device(s) 302 can receive an inquiry for data of the first driving sequence S1. In response, the client computing device(s) 302 can query the database to locate the first sequence of data and the second sequence of data that are associated with the first driving sequence 51.

In some instances, the UI 304 can present a visualization 306(1) and a visualization 306(2) of the first driving sequence S1 based on the first sequence of data and the second sequence of data. For example, the first driving sequence S1 of "general bicycle handling in junctions" can be defined by parameters/attributes such as an agent type of "bicyclist," a junction type of "any," the vehicle being in the junction, an agent maneuver type of "any," a vehicle maneuver type of "moving forward," and so on. As an example, the first sequence of data may include sub-sequences labeled as "vehicle 308 in the junction," "vehicle moving forward," "bicyclist 310(1) in the junction" "bicyclist 310(1) turning left" and/or the like. Therefore, the first sequence of data satisfies the parameters/attributes of the first driving sequence S1, and can be cataloged as (associated with) the first driving sequence S1 in the database. As another example, the second sequence of data may include sub-sequences labeled as "vehicle 308 in the junction," "vehicle 308 moving forward," "bicyclist 310(2) in the junction," "bicyclist 310(2) moving forward," and/or the like. Therefore, the second sequence of data satisfies the parameters/attributes of the second driving sequence S1 and can be cataloged as (associated with) the first driving sequence S1 in the database. As such, visualization 306(1) and visualization 306(2) can illustrate the first sequence of data and the second sequence of data in a visualized manner via the UI 304.

In some instances, the UI 304 can present a visualization 312(1) and a visualization 312(2) associated with the second driving sequence S2 based on the third sequence of data and the fourth sequence of data. For example, the third sequence of data and the fourth sequence of data can be associated with the second driving sequence S2 of "pedestrian with an object." For example, the second driving sequence S2 of "pedestrian with an object" can be defined by parameters/attributes such as an agent type of "pedestrian," an object type of "any," a distance between the object and the agent is less than three feet, an agent maneuver type of "crossing," a vehicle maneuver type of "moving forward," and so on. As an example, the third sequence of data may include sub-sequences labeled as "vehicle 308 moving forward," "pedestrian 314(1)," "pedestrian 314(1) with an object," and "pedestrian 314(1) crossing a road," and/or the like. Therefore, the third sequence of data satisfies the parameters/attributes of the second driving sequence S2, and can be cataloged as (associated with) the second driving sequence S2 in the database. As another example, the fourth sequence of data may include sub-sequences labeled as "vehicle 308 moving forward," "pedestrian 314(2)," "pedestrian 314(1) holding an object," "pedestrian 314(2) crossing the road," and/or the like. Therefore, the fourth sequence of data satisfies the parameters/attributes of the second driving sequence S2 and can be cataloged as (associated with) the second driving sequence S2 in the database. As such, visualization 312(1) and visualization 306(2) can illustrate the third sequence of data and the fourth sequence of data in a visualized manner via the UI 304.

In some instances, the UI 304 can present a visualization 316 of an Nth driving sequence Sn. The Nth driving sequence $S_N$ of "lane blocked by objects" can be defined by parameters/attributes such as an object type of "any," a location of the object is "in lane," and so on. As an example, the fifth sequence of data can include sub-sequences labeled as "object 318 in lane," "object 320 in lane," and/or the like. Therefore, the fifth sequence of data satisfies the parameters/attributes of the Nth driving sequence $S_N$ and can be cataloged as (associated with) the Nth driving sequence $S_N$ in the database. As such, the visualization 306(1) can illustrate the fifth sequence of data in a visualized manner via the UI 304.

As described above, techniques for generating driving sequences based on log data are discussed in U.S. application Ser. No. 16/866,715, titled "System for Generating Generalized Simulation Scenarios," which is herein incorporated by reference in its entirety for all purposes.

Figure 4:
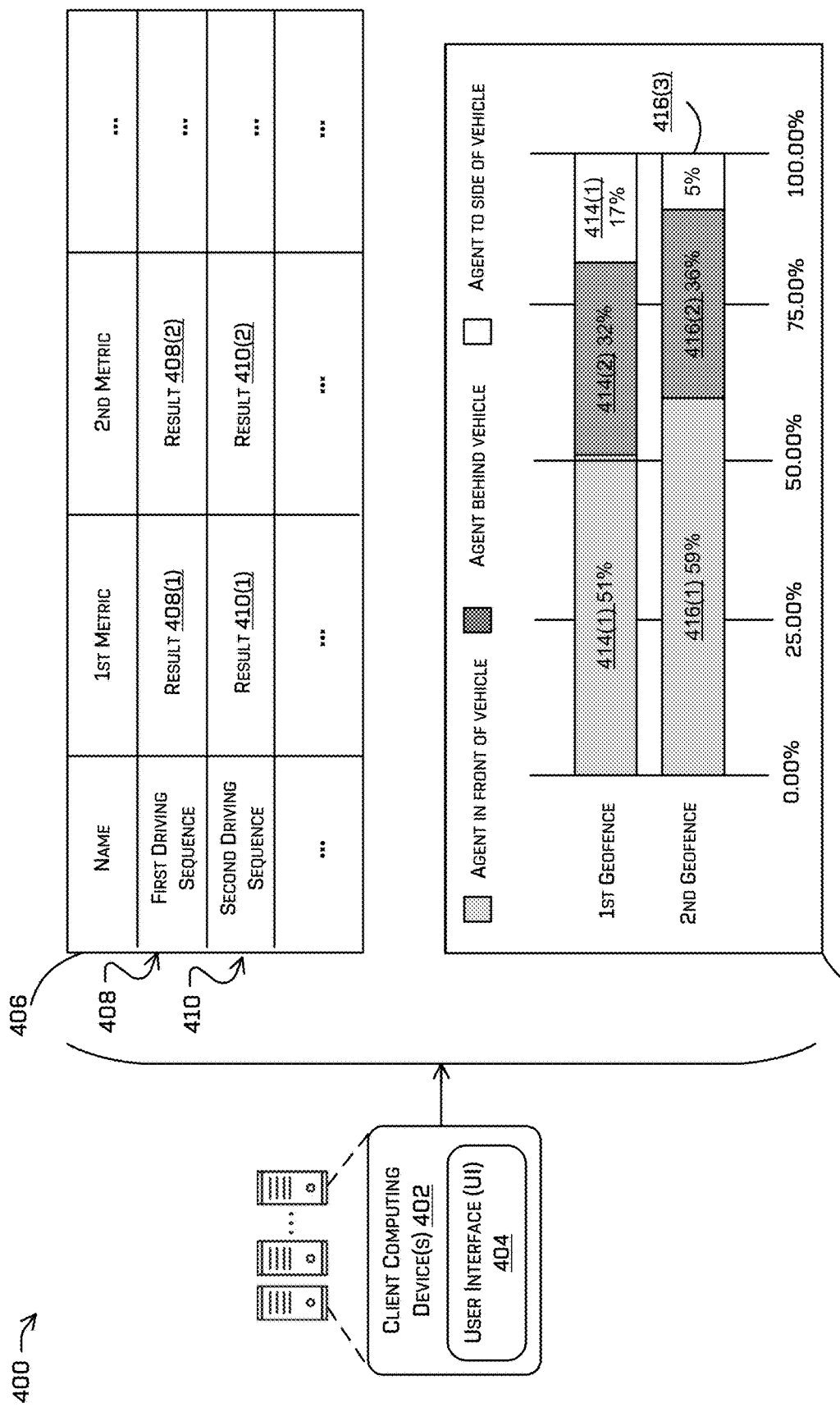
FIG. 4 illustrates an example where client computing device(s) can present metrics associated with one or more driving sequences via a user interface (UI), in accordance with implementations of the disclosure.

FIG. 4 illustrates an example 400 where client computing device(s) 402 can present metrics associated with one or more driving sequences via a user interface (UI) 404, in accordance with implementations of the disclosure. As described herein, the metrics can indicate how often a certain driving sequence (e.g., double parked vehicle, unprotected left turn, etc.) occurs, how many times a driving sequence occurs per mile, how a vehicle performs in the same driving sequence, the total number of non-traffic junctions the vehicle passes through, the total number of pedestrian tracks that the vehicle is yielding/cautioning to, the total number of stopped agents the vehicle passed by, the miles the vehicle drives through a driving sequence, a ratio of a duration of the driving sequence to a whole duration the vehicle traversed, or a ratio of a number of miles associated with the driving sequence for the vehicle to a number of total miles traversed by the vehicle, etc.

Referring to FIG. 4, the client computing device(s) 402 can present, via the UI 404, a table 406 illustrating metrics associated with one or more driving sequences. For example, the table 406 can include a driving sequence name, first metric, second metric, and the like. For example, a first driving sequence 408 can have a result 408(1) for the first metric, and a result 408(2) for the second metric. For example, a second driving sequence 410 can have a result 410(1) for the first metric, and a result 410(2) for the second metric.

As a non-limiting example, the first driving sequence 408 can be "big trucks proceeding through junction." For example, the first metric can be "driving sequence per mile" (indicating how many times the first driving sequence occurs per mile). For example, the second metric can be "mile per driving sequence" (indicating the miles a vehicle travels as opposed to the number of the first driving sequence). For example, the result 408(1) for the first metric can be 0.006 (indicating that the first driving sequence occurs 0.006 times per mile), and a result 408(2) for the second metric can be 166.67 (indicating that the first driving sequence occurs once every 166.67 miles a vehicle travels). It should be understood that numbers and driving sequence names are for illustration purposes, and this disclosure is not limited thereto.

In some examples, a total mileage traveled determination can be made for a vehicle across a log database based on metadata associated with each log (e.g., a change in odometer output associated with each log) and/or by direct analysis of the logs. For example, the logs may capture data in distinct time periods wherein changes of position can be calculated for the time periods for a vehicle or other object. In this manner, a number of events per mile (or other distance measurements) may be determined. Similarly, a number of miles that a sequence or label is active can be determined and/or compared to a total number of miles traversed. Similarly or in combination, an event per time unit determination can be made by comparing changes in time that a collection of logs represents. Similarly, a time that an event or label is active can be determined compared to a total time. Using these techniques, a compound sequence may be, for example, an unprotected left turn and a number of unprotected left turns per mile, per minute, per hour, etc. can be determined for a specific data set. As disclosed herein, these metrics may be further limited for certain geolocations or bounds such that a number of events per city mile can be determined, for example.

The client computing device(s) 402 can present, via the UI 404, a stacked bar chart 412 illustrating metrics associated with one or more driving sequences in various geofences. As described above, a geofence can represent a virtual perimeter for real-world geographic areas in the environment that are compatible with the environment. In the chart 412, bars 414(1), 414(2), and 414(3) can represent metrics associated with the first driving sequence in a first geofence, and bars 416(1), 416(2), 416(3) can represent metrics associated with the second driving sequence in a second geofence. As a non-limiting example, the first driving sequence can be "agent in front of the vehicle", the second driving sequence can be "agent behind the vehicle", and the third driving sequence can be "agent to the side of the vehicle." As described herein, a percentage can be a proportion or share in relation to a total number. For example, the total number can be the total number of the first, second, and third driving sequences. For example, bar 414(1) can indicate that a percentage of the first driving sequence (e.g., "agent in front of the vehicle") that occurs in the first geofence is 51%. For example, bar 414(2) can indicate that a percentage of the second driving sequence (e.g., "agent behind the vehicle") that occurs in the first geofence is 37%. For example, bar 414(3) can indicate that a percentage of the third driving sequence (e.g., "agent in front of the vehicle") that occurs in the first geofence is 17%. For example, bar 416(1) can indicate that a percentage of the first driving sequence (e.g., "agent in front of the vehicle") that occurs in a first geofence is 59%. For example, bar 416(2) can indicate that a percentage of the second driving sequence (e.g., "agent behind the vehicle") that occurs in a second geofence is 36%. For example, bar 416(3) can indicate that a percentage of the third driving sequence (e.g., "agent behind the vehicle") occurs in a second geofence is 5%. Note that numbers here are examples rather than limitations, other numbers or percentages can be determined based on actual data.

Note that the table 406 and the chart 412 are examples of showing metrics associated with one or more driving sequences. Any suitable manners can be used to illustrate metrics associated with one or more driving sequences.

Figure 5:
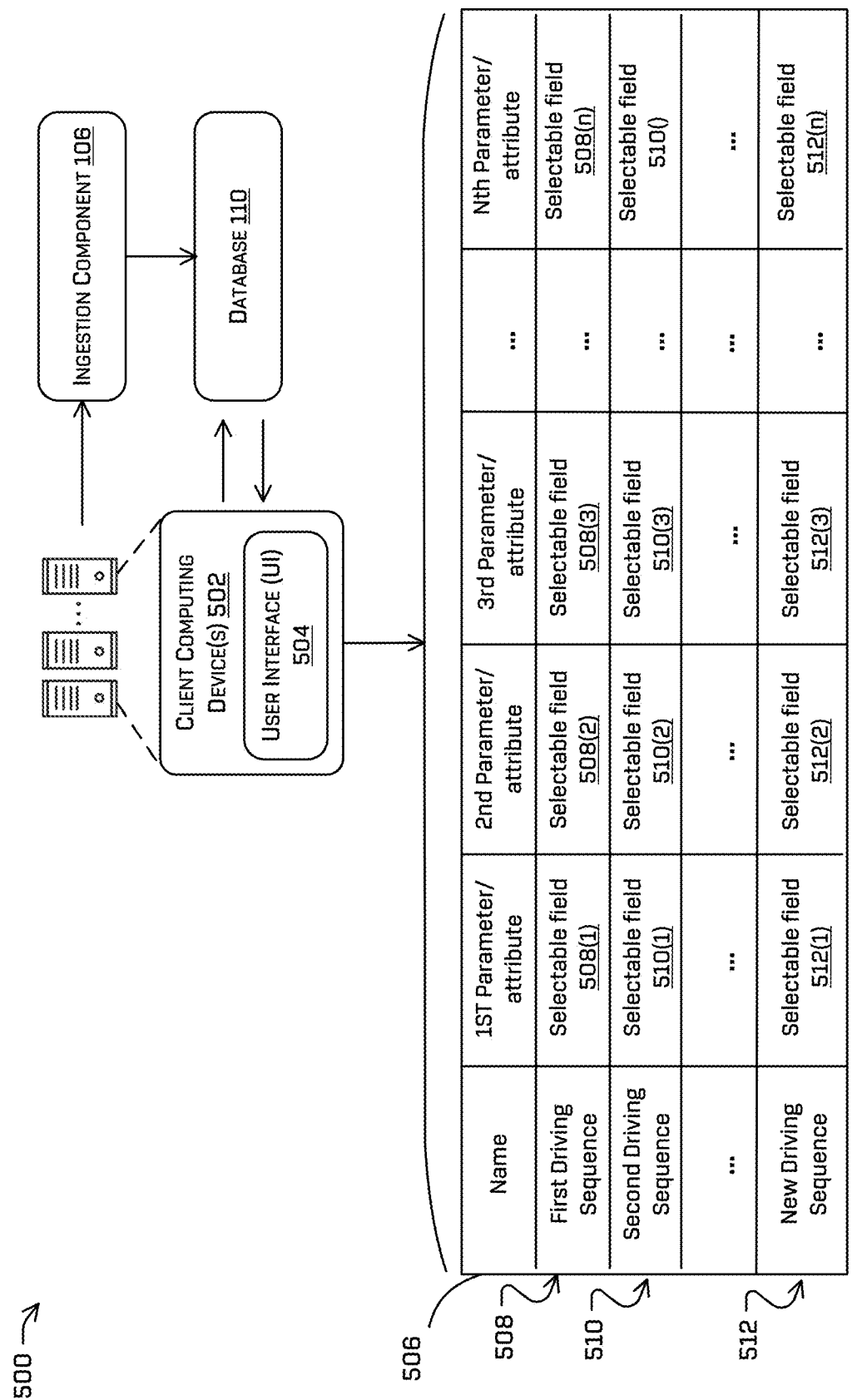
FIG. 5 illustrates an example of client computing device(s) including a UI providing functionality to configure/define the driving sequences in the catalog, in accordance with implementations of the disclosure.

FIG. 5 illustrates an example 500 of client computing device(s) 502 including a UI 504 providing functionality to configure/define the driving sequences in the catalog 506, in accordance with implementations of the disclosure. As discussed herein, the catalog 506 can define various driving sequences (e.g., a first driving sequence 508, a second driving sequence 510, and the like) based on one or more parameters/attributes (e.g., a first parameter/attribute, a second parameter/attribute, a third parameter/attribute, a fourth parameter/attribute, . . . and an nth parameter/attribute, where n is a positive integer). As discussed above, a respective driving sequence can have a driving sequence name and can be defined by the one or more parameters/attributes such as a geometric attribute associated with the object, a geometric attribute associated with the vehicle, an environmental attribute, a classification of the object, and/or the like. For example, the one or more parameters/attributes can include, but are not limited to, the day and time, whether the vehicle is in junction, a junction type, a number of lanes in the junction, a vehicle maneuver, a traffic control type, an agent type, a location of the agent (where is the agent), a relative position of the agent (relative to the vehicle), whether the agent is oncoming or ongoing, an agent maneuver, and the like. In some examples, the parameters/attributes can be represented by labels which can be associated with sub-sequences or ticks of data in the log data. Additional details of the parameters/attributes are described throughout this disclosure.

The client computing device(s) 502 can include a user interface (UI) 504 configured to present the catalog 506 with multiple selectable fields that allow a user to select options for the one or more parameters/attributes. In some instances, for the first driving sequence 508, the UI 504 can present selectable fields 508(1), 508(2), 508(3), 508(4), . . . and 508(n). For example, the selectable fields 508(1), 508(2), 508(3), 508(4), . . . and 508(n) can allow the first parameter/attribute, the second parameter/attribute, the third parameter/attribute, and the nth parameter/attribute associated with the first driving sequence 508 to be configured and/or selected from multiple options. As a non-limiting example, a first parameter/attribute of "day and time" can be selected from Monday, Tuesday, Wednesday, Thursday, Friday, Saturday, Sunday, weekdays, from 7 AM to 7 PM, and the like. For example, a second parameter/attribute of "whether the vehicle is in junction" can be selected from "true," "false," or "either." For example, a third parameter/attribute of "junction type" can be selected from "a non-traffic light (NTLJ) junction," "a traffic light (TLJ) junction," a "first-in-first-out (FIFO) junction," an "autonomous vehicle priority junction," "an autonomous vehicle non-priority junction," a "merge junction," and the like. For example, an nth parameter/attribute of the "number of lanes in the junction" can be selected from 2, 3, 4, and the like. In some examples, there can be an option of "any" in a selectable field for a respective parameter/attribute, indicating that the parameter/attribute can be any option. In some examples, a selectable field can be left blank for a respective parameter/attribute, indicating that the parameter/attribute is not limited.

For the second driving sequence 510, the UI 504 can present selectable fields 510(1), 510(2), 510(3), 510(4), ... and 510(n) that can allow the first parameter, the second parameter, the third parameter, and the nth parameter associated with the second driving sequence 510 to be configured and/or selected from multiple options. Details of the selectable fields 510(1), 510(2), 510(3), 510(4), ..., and 510(n) can be the same as those described above with respect to the first driving sequence 508.

In some examples, the UI 504 can allow a new driving sequence 512 to be added to the catalog 506. The UI 504 can present selectable fields 512(1), 512(2), 512(3), 512(4), ... and 512(n) that can allow the first parameter, the second parameter, the third parameter, and the nth parameter associated with the new driving sequence 512 to be configured and/or selected from multiple options. Details of the selectable fields 512(1), 512(2), 512(3), 512(4), ... and 512(n) can be the same as those described above with respect to the first driving sequence 508. As a non-limiting example, the new driving sequence 512 can have the name of "big trucks proceeding through junction" and have the following parameters/attributes. For example, a first parameter of "whether the vehicle is in the junction can be "false." For example, a second parameter of "agent type" can be "truck." For example, a third parameter of "location of the agent" can be "lane." For example, an nth parameter of "junction type" can be "any." As such, the new driving sequence 512 can be defined and added into the catalog 506.

In some instances, the client computing device(s) 502 can update the catalog 506 based on one or more options being selected via the selectable fields. In some instances, the client computing device(s) 502 can communicate with the ingestion component 106 as described with respect to FIG. 1A to send the updated catalog 506 to the ingestion component 106. In some instances, the ingestion component 106 can scan the log data again and label the log data based on the updated catalog 506. In that case, the ingestion component 106 can update the cataloged data in the database 114. In some instances, the client computing device(s) 502 can receive an inquiry requesting log data associated with one or more driving sequences after the catalog 506 is updated and the cataloged data in the database is updated. The client computing device(s) 502 can query the database 114 to locate the log data associated with one or more driving sequences in the updated cataloged data.

Figure 6:
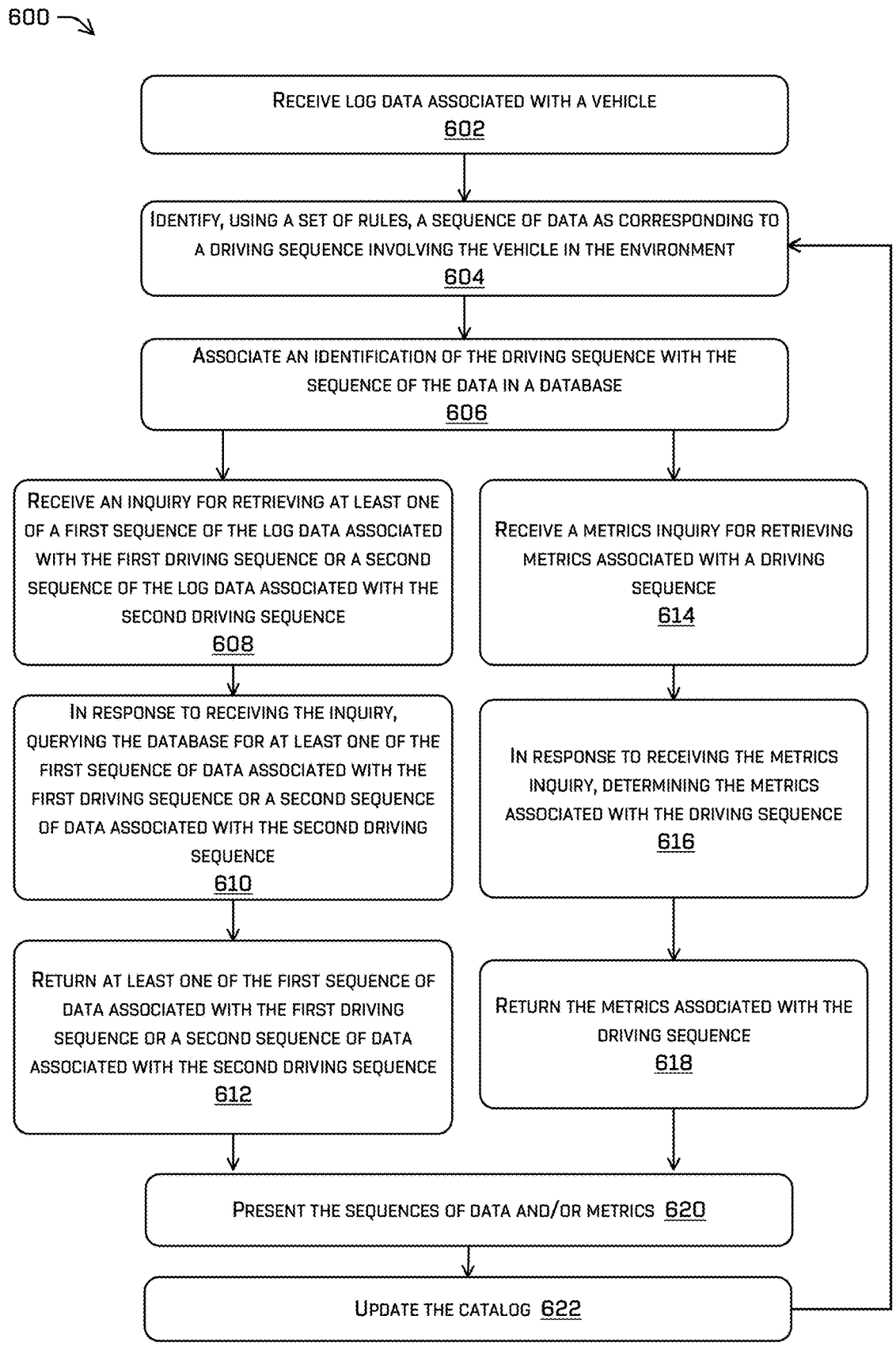
FIG. 6 is a flow diagram illustrating an example process associated with ingesting the log data based on predefined driving sequences, in accordance with implementations of the disclosure.

FIG. 6 is a flow diagram illustrating an example process 600 associated with ingesting the log data based on pre-defined driving sequences, in accordance with implementations of the disclosure. As described herein the catalog can define various driving sequences based on one or more parameters/attributes. In some examples, the one or more parameters/attributes can include a geometric attribute associated with the object, a geometric attribute associated with the vehicle, an environmental attribute, a classification of the object, and/or the like. For example, the one or more parameters/attributes can include a state of an object, a position of the object relative to the vehicle, a state of the vehicle, a planned maneuver of the vehicle, a distance to an intersection, a lane identifier, a road identifier, and the like. In some examples, the attributes can be represented by labels which can be automatically associated with sub-sequences or ticks of data in the log data. Additional details are described throughout this disclosure.

At 602, operations can include receiving log data associated with a vehicle. In some examples, the log data can include at least one of geometric relevant location data, state data, or prediction data. For example, the log data can include sensor data captured by one or more sensors of the vehicle, perception data indicating objects identified by one or more systems onboard the vehicle (or produced during a post-processing phase), prediction data indicating an intent of objects (whether produced during the recording or subsequent thereto), and/or status data indicating diagnostic information, trajectory information, and other information generated by the vehicle. In some examples, the vehicle can transmit the log data, via a network, to an ingestion component.

At 604, operations can include identifying, using a set of rules, a sequence of data as corresponding to a driving sequence involving the vehicle in the environment. In some examples, the rules can be determined based on predetermined/predefined driving sequences (such as the predefined driving sequences 116). In some instances, the catalog can define various driving sequences using one or more attributes. For example, an individual driving sequence can be defined by a geometric attribute associated with the object, a geometric attribute associated with the vehicle, an environmental attribute, a classification of the object, and/or the like. For example, an individual driving sequence can be a driving sequence of "general bicycle handling in junctions," a driving sequence of "parking in an open space," a driving sequence of "big trucks proceeding through junction," or the like.

As described herein, the log data can include a series of ticks of data ordered in time that are usable to determine the one or more driving sequences. The operations of identifying a sequence of data in the log data as corresponding to a driving sequence can include the following. An individual tick of data in the time series can be associated with at least one of a first label of a geometric attribute associated with the object, a second label of a geometric attribute associated with the vehicle, a third label of an environmental attribute, a fourth label of a classification of the object, and/or the like. In some examples, a first sub-sequence of data including one or more ticks of data associated with a first attribute (a first label) can be identified. In some examples, a second sub-sequence of data including one or more ticks of data associated with a second attribute (a second label) can be identified. The first sub-sequence of data and the second sub-sequence of data can be combined to generate a combined sequence of data. Additional details are given with respect to FIG. 1B.

At 606, operations can include associating an identification of the driving sequence with the sequence of data in a database. In some examples, the ingestion component can scan the log data to generate the cataloged data, and store the cataloged data in a database. For example, the ingestion component can associate a first identification of a first driving sequence with a first sequence of data using the set of rules. The set of rules can be determined based on the predetermined/predefined driving sequences. As another example, the ingestion component can associate a second sequence of data with a second identification of a second driving sequence using the set of rules. In some examples, the identification of the driving sequence can be the name of the driving sequence, a classification number, or the like. In some examples, the database can be a local database of a computing device, an online database, a cloud database, etc.

At 608, operations can include receiving an inquiry for retrieving at least one of a first sequence of data associated with the first driving sequence or a second sequence of data associated with the second driving sequence. As an example, the inquiry can request a first sequence of data associated with a first driving sequence of "general bicycle handling in junctions," a second sequence of data associated with a second driving sequence of "bike attempting to pass the vehicle," or the like. In some examples, the inquiry can be made via a client computing device (such as the client computing device(s) 208 described with respect to FIG. 2, the client computing device(s) 302 described with respect to FIG. 3, the client computing device(s) 402 described with respect to FIG. 4, the client computing device(s) 502 described with respect to FIG. 5, or the like).

At 610, operations can include in response to receiving the inquiry, querying the database for at least one of the first sequence of data associated with the first driving sequence or a second sequence of data associated with the second driving sequence. In some examples, a mining component can query the database to locate sequences of data associated with the first driving sequence and/or sequences of data associated with the second driving sequence.

At 612, operations can include returning at least one of the first sequence of data associated with the first driving sequence or a second sequence of data associated with the second driving sequence. In some examples, the mining component can return sequences of data associated with the first driving sequence and/or sequences of data associated with the second driving sequence.

At 614, operations can include receiving a metrics inquiry for retrieving metrics associated with a driving sequence. In some instances, the metrics can indicate how often a driving sequence occurs, how many times a driving sequence occurs per mile, how a vehicle performs in the same driving sequence, the total number of non-traffic junctions the vehicle passes through, the total number of pedestrian tracks that the vehicle is yielding/cautioning to, the total number of stopped agents the vehicle passed by, the miles the vehicle drives through a driving sequence, a ratio of a duration of the driving sequence to a whole duration the vehicle traversed, or a ratio of a number of miles associated with the driving sequence for the vehicle to a number of total miles traversed by the vehicle, etc.

At 616, operations can include in response to receiving the metrics inquiry, determining the metrics associated with the driving sequence. As a non-limiting example, the metrics inquiry can request metrics regarding how many times the first driving sequence of "general bicycle handling in junctions" occurs in the log data. The mining component can query the database to determine that 6 sequences of data are associated with the first driving sequence of "general bicycle handling in junctions." As such, the metrics associated with the first driving sequence can be determined as 6. In some examples, the mining component can search the database to determine metrics regarding a proportion, such as, the time in the driving sequences that the criteria are active versus a total recorded time, a time of the driving sequences versus a total recorded time, a number of miles versus a total number of miles the vehicle traverses in the whole log data set, a number of instances of the driving sequence, a ratio of a duration of the driving sequence to a whole duration the vehicle traversed, or a ratio of a number of miles associated with the driving sequence for the vehicle to a number of total miles traversed by the vehicle, or the like.

At 618, operations can include returning the metrics associated with the driving sequence. For example, the mining component can query the database to determine that 6 sequences of data are associated with the first driving sequence of "general bicycle handling in junctions." Then, the mining component can return 6 as the metrics associated with the first driving sequence. In some examples, the mining component can return other metrics such as the time in the driving sequences that the criteria are active versus a total recorded time, a time of the driving sequences versus a total recorded time, a number of miles versus a total number of miles the vehicle traverses in the whole log data set, a ratio of a duration of the driving sequence to a whole duration the vehicle traversed, or a ratio of a number of miles associated with the driving sequence for the vehicle to a number of total miles traversed by the vehicle, or the like. In some examples, the mining component can generate tables, charts, graphs, plots, or the like to illustrate the metrics.

At 620, operations can include presenting, via a user interface (UI), the sequences of data and/or the metrics associated with one or more driving sequences. For example, the UI can present a first sequence of data associated with the first driving sequence and/or a second sequence of data associated with the second driving sequence. As another example, the UI can present the metrics associated with one or more driving sequences. In some examples, metrics can be presented in the forms of tables, charts, graphs, plots, or the like. Additional details of presenting the query results are described with respect to FIG. 3 and FIG. 4.

At 622, operations can include updating the catalog to generate an updated catalog (such as the catalog 506 described with respect to FIG. 5). In some examples, the catalog can include definitions of various predetermined driving sequences. In some examples, the UI can present individual driving sequences in the catalog with one or more selectable fields. A respective selectable field can be configured to define a parameter/attribute. The respective selectable field can include one or more options. The UI can receive a selection via the one or more selectable fields. In some examples, the driving sequences in the catalog can be redefined by changing one or more attributes of the driving sequence. Additionally or alternatively, new driving sequences can be added to the catalog. Additional details are given throughout this disclosure such as with respect to FIG. 5. In some examples, the client computing device(s) which includes the UI can update the catalog based at least in part on the selection. The client computing device(s) can send the updated catalog to the ingestion component.

In some examples, the process 600 can go back to 604 such that the ingestion component can update the cataloged data in the database based at least in part on the updated catalog. As such, a user such as an engineer can configure/refine driving sequences in the catalog to mine for related log data in the database.

In the above process 600, the order in which the operations are described should not be construed as a limitation. Any number of the described blocks can be combined in any order and/or in parallel to implement the processes, or alternative processes, and not all of the blocks need to be executed. For discussion purposes, the processes herein are described with reference to the frameworks, architectures, and environments described in the examples herein, although the process may be implemented in a wide variety of other frameworks, architectures, or environments.

Figure 7:
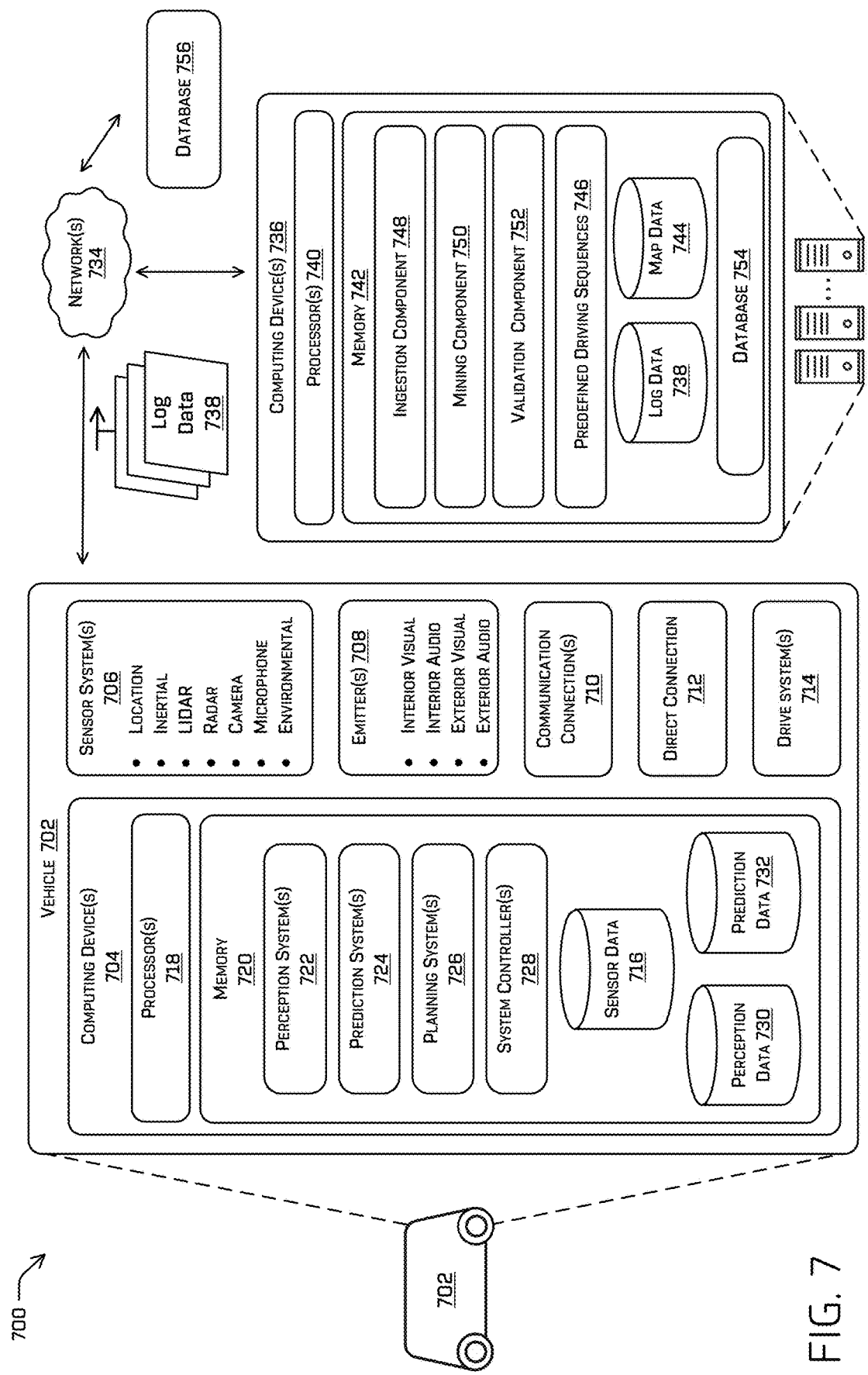
FIG. 7 depicts a block diagram of an example system for implementing the techniques discussed herein.

FIG. 7 depicts a block diagram of an example system 700 for implementing the techniques discussed herein. In at least one example, the system 700 may include a vehicle 702, such as the autonomous vehicles discussed above. The vehicle 702 may include computing device(s) 704, one or more sensor system(s) 706, one or more emitter(s) 708, one or more communication connection(s) 710 (also referred to as communication device(s) and/or modems), at least one direct connection 712 (e.g., for physically coupling with the vehicle 702 to exchange data and/or to provide power), and one or more drive system(s) 714. The one or more sensor system(s) 706 may be configured to capture the sensor data 716 associated with a surrounding physical environment.

In at least some examples, the sensor system(s) 706 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. In some examples, the sensor system(s) 706 may include multiple instances of each type of sensor. For instance, time-of-flight sensors may include individual time-of-flight sensors located at the corners, front, back, sides, and/or top of the vehicle 702. As another example, camera sensors may include multiple cameras disposed at various locations about the exterior and/or interior of the vehicle 702. In some cases, the sensor system(s) 706 may provide input to the computing device(s) 704.

The vehicle 702 may also include one or more emitter(s) 708 for emitting light and/or sound. The one or more emitter(s) 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 708 in this example also includes exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 702 can also include one or more communication connection(s) 710 that enable communication between the vehicle 702 and one or more other local or remote computing device(s) (e.g., a remote teleoperations computing device) or remote services. For instance, the communication connection(s) 710 can facilitate communication with other local computing device(s) on the vehicle 702 and/or the drive system(s) 714. Also, the communication connection(s) 710 may allow the vehicle 702 to communicate with other nearby computing device(s) (e.g., other nearby vehicles, traffic signals, etc.).

The communications connection(s) 710 may include physical and/or logical interfaces for connecting the computing device(s) 704 to another computing device or one or more external network(s) 734 (e.g., the Internet). For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s). In at least some examples, the communication connection(s) 710 may comprise the one or more modems as described in detail above.

In at least one example, the vehicle 702 may include one or more drive system(s) 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 can include one or more sensor system(s) 706 to detect conditions of the drive system(s) 714 and/or the surroundings of the vehicle 702. By way of example and not limitation, the sensor system(s) 706 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 714. In some cases, the sensor system(s) 706 on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which may receive and preprocess data from the sensor system(s) 706 and to control operation of the various vehicle systems. In some examples, the drive system controller can include one or more processor(s) and memory communicatively coupled with the one or more processor(s). The memory can store one or more modules to perform various functionalities of the drive system(s) 714. Furthermore, the drive system(s) 714 also includes one or more communication connection(s) that enable communication by the respective drive system with one or more other local or remote computing device(s).

The computing device(s) 704 may include one or more processors 718 and one or more memories 720 communicatively coupled with the processor(s) 718. In the illustrated example, the memory 720 of the computing device(s) 704 stores perception systems(s) 722, prediction systems(s) 724, planning systems(s) 726, as well as one or more system controller(s) 728. The memory 720 may also store data such as sensor data 716 captured or collected by the one or more sensors systems 706, perception data 730 associated with the processed (e.g., classified and segmented) sensor data 716, prediction data 732 associated with one or more predicted state of the environment and/or detected objects within the environment. Though depicted as residing in the memory 720 for illustrative purposes, it is contemplated that the perception systems(s) 722, prediction systems(s) 724, planning systems(s) 726, as well as one or more system controller(s) 728 may additionally, or alternatively, be accessible to the computing device(s) 704 (e.g., stored in a different component of vehicle 702 and/or be accessible to the vehicle 702 (e.g., stored remotely).

The perception system 722 may be configured to perform object detection, segmentation, and/or classification on the sensor data 716. In some examples, the perception system 722 may generate processed perception data 730 from the sensor data 716. The perception data 730 may indicate a presence of objects that are in physical proximity to the vehicle 702 and/or a classification or type of the objects (e.g., car, pedestrian, cyclist, building, tree, road surface, curb, sidewalk, unknown, etc.). In additional and/or alternative examples, the perception system 722 may generate or identify one or more characteristics associated with the objects and/or the physical environment. In some examples, characteristics associated with the objects may include, but are not limited to, an x-position, a y-position, a z-position, an orientation, a type (e.g., a classification), a velocity, a size, a direction of travel, etc. Characteristics associated with the environment may include, but are not limited to, a presence of another object, a time of day, a weather condition, a geographic position, an indication of darkness/light, etc. For example, details of classification and/or segmentation associated with a perception system are discussed in U.S. application Ser. No. 15/820,245, which are herein incorporated by reference in their entirety for all purposes.

The prediction system 724 may be configured to determine a track corresponding to an object identified by the perception system 722. For example, the prediction system 724 may be configured to predict a velocity, position, change in trajectory, or otherwise predict the decisions and movement of the identified objects. For example, the prediction system 724 may include one or more machine learned models that may, based on inputs such as object type or classification and object characteristics, output predicted characteristics of the object at one or more future points in time. For example, details of predictions systems are discussed in U.S. application Ser. Nos. 16/246,208 and 16/420,050, which are herein incorporated by reference in their entirety.

The planning system 726 may be configured to determine a route for the vehicle 702 to follow to traverse through an environment. For example, the planning system 726 may determine various routes and paths and various levels of detail based at least in part on the objects detected, the predicted characteristics of the object at future times, and a set of safety requirements corresponding to the current driving sequence (e.g., combination of objects detected and/or environmental conditions). In some instances, the planning system 726 may determine a route to travel from a first location (e.g., a current location) to a second location (e.g., a target location) in order to avoid an object obstructing or blocking a planned path of the vehicle 702. In some case, a route can be a sequence of waypoints for traveling between the two locations (e.g., the first location and the second location). In some cases, waypoints include streets, intersections, global positioning system (GPS) coordinates, etc. For example, details of path and route planning by the planning system are discussed in U.S. application Ser. Nos. 16/805,118 and 15/632,208, which are herein incorporated by reference, in their entirety.

In at least one example, the computing device(s) 704 may store one or more and/or system controllers 728, which may be configured to control steering, propulsion, braking, safety, emitters, communication, and other systems of the vehicle 702. The system controllers 728 may communicate with and/or control corresponding systems of the drive system(s) 714 and/or other components of the vehicle 702, which may be configured to operate in accordance with a route provided from the planning system 726.

In some implementations, the vehicle 702 may connect to computing device(s) 736 via the network(s) 734. For example, the computing device(s) 736 may receive log data 738 from one or more vehicles 702. The log data 738 may include the sensor data, perception data 730, prediction data 732 and/or a combination thereof. In some cases, the log data 738 may include a sequence of one or more of the sensor data, perception data 730, and prediction data 732.

The computing device(s) 736 may include one or more processors 740 and memory 742 communicatively coupled with the one or more processors 740. In at least one instance, the processor(s) 740 may be similar to the processor(s) 718 and the memory 742 may be similar to the memory 720. In the illustrated example, the memory 742 of the computing device(s) 736 stores the log data 738 received from one or more vehicles 702. The memory 742 may also store map data 744 associated with objects and/or the vehicle 702 represented in the log data 738. The memory 742 may also store the predefined driving sequences 746. The memory 742 may also store an ingestion component 748, a mining component 750, and a validation component 752. The ingestion component 748, the mining component 750, and the validation component 752 can correspond to the ingestion component 106, the mining component 120, and the validation component 118 respectively.

The ingestion component 748 can ingest the log data 738 to generate cataloged data (labeled data) based on the predefined driving sequences 746. In some examples, the ingestion component 748 can store the cataloged data (labeled data) in a database, such as a local database 754 of the computing device(s) 736, a remote database 756, and the like. In some examples, the catalog can define various driving sequences, such as a first driving sequence, a second driving sequence, and an nth driving sequence, wherein n is a positive integer. For example, the ingestion component 748 can label a first sequence of data as the first driving sequence based on the predefined driving sequences. For example, the ingestion component 748 can label a second sequence of data as the second driving sequence based at least in part on the predefined driving sequences.

The mining component 750 can access the database 754 and/or the database 756 to retrieve or mine the cataloged data. In some examples, the mining component 750 can query the database 754 and/or the database 756 for log data associated with one or more driving sequences. In some examples, the mining component 750 can query the database 754 and/or the database 756 to determine metrics associated with one or more driving sequences. In some instances, the metrics can indicate how often a driving sequence occurs, how many times a driving sequence occurs per mile, how a vehicle performs in the same driving sequence, the total number of non-traffic junctions the vehicle passes through, the total number of pedestrian tracks that the vehicle is yielding/cautioning to, the total number of stopped agents the vehicle passed by, the miles the vehicle drives through a driving sequence, a ratio of a duration of the driving sequence to a whole duration the vehicle traversed, or a ratio of a number of miles associated with the driving sequence for the vehicle to a number of total miles traversed by the vehicle, etc.

The validation component 752 can validate the cataloged data. For example, a sequence of data may be associated with the first driving sequence. In some examples, the validation component 752 can receive an indication from an operator indicating whether the sequence of data belongs to the first driving sequence. In some examples, the validation component 752 can receive ground truth data and determine whether the sequence of data belongs to the first driving sequence based on the ground truth data.

The processor(s) 718 of the computing device(s) 704 and the processor(s) 740 of the computing device(s) 736 may be any suitable processor capable of executing instructions to process data and perform operations as described herein. By way of example and not limitation, the processor(s) 718 and 740 can comprise one or more Central Processing Units (CPUs), Graphics Processing Units (GPUs), or any other device or sequence of a device that processes electronic data to transform that electronic data into other electronic data that can be stored in registers and/or memory. In some examples, integrated circuits (e.g., ASICs, etc.), gate arrays (e.g., FPGAs, etc.), and other hardware device(s) can also be considered processors in so far as they are configured to implement encoded instructions.

The memory 720 of the computing device(s) 704 and the memory 742 of the computing device(s) 736 are examples of non-transitory computer-readable media. The memory 720 and 742 can store an operating system and one or more software applications, instructions, programs, and/or data to implement the methods described herein and the functions attributed to the various systems. In various implementations, the memory 720 and 742 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine learning algorithms. For example, in some instances, the components in the memory 720 and 742 can be implemented as a neural network.

CONCLUSION

While one or more examples of the techniques described herein have been described, various alterations, additions, permutations, and equivalents thereof are included within the scope of the techniques described herein. As can be understood, the components discussed herein are described as divided for illustrative purposes. However, the operations performed by the various components can be combined or performed in any other component. It should also be understood, that components or steps discussed with respect to one example or implementation may be used in conjunction with components or steps of other examples. For example, the components and instructions of FIG. 7 may utilize the processes and flows of FIGS. 1-7.

A non-limiting list of objects may include obstacles in an environment, including but not limited to pedestrians, animals, cyclists, trucks, motorcycles, other vehicles, or the like. Such objects in the environment have a "geometric pose" (which may also be referred to herein as merely "pose") comprising a location and/or orientation of the overall object relative to a frame of reference. In some examples, pose may be indicative of a position of an object (e.g., pedestrian), an orientation of the object, or relative appendage positions of the object. Geometric pose may be described in two dimensions (e.g., using an x-y coordinate system) or three dimensions (e.g., using an x-y-z or polar coordinate system), and may include an orientation (e.g., roll, pitch, and/or yaw) of the object. Some objects, such as pedestrians and animals, also have what is referred to herein as "appearance pose." Appearance pose comprises a shape and/or positioning of parts of a body (e.g., appendages, head, torso, eyes, hands, feet, etc.). As used herein, the term "pose" refers to both the "geometric pose" of an object relative to a frame of reference and, in the case of pedestrians, animals, and other objects capable of changing shape and/or positioning of parts of a body, "appearance pose." In some examples, the frame of reference is described with reference to a two- or three-dimensional coordinate system or map that describes the location of objects relative to a vehicle. However, in other examples, other frames of reference may be used.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes, or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A: A system comprising: one or more processors; and one or more non-transitory computer-readable media storing instructions that, when executed by the one or more processors, cause the one or more processors to perform operations comprising: receiving log data associated with a vehicle in an environment, the log data including information about the vehicle and information about an object in the environment in which the vehicle is operating, the log data including at least one of location data, state data, or prediction data; associating, based at least in part on predetermined driving sequences, a first sequence of data in the log data with a first driving sequence of the predetermined driving sequences; associating, based at least in part on the predetermined driving sequences, a second sequence of data in the log data with a second driving sequence of the predetermined driving sequences; receiving an inquiry for retrieving data associated with the first driving sequence or the second driving sequence; and in response to receiving the inquiry, retrieving the first sequence of data or the second sequence of data.

B: The system of paragraph A, wherein the predetermined driving sequences comprise an individual driving sequence determined based on a first label of a geometric attribute associated with the object, a second label of a geometric attribute associated with the vehicle, a third label of an environmental attribute, or a fourth label of a classification of the object.

C: The system of paragraph B, wherein the individual driving sequence is further determined based on a temporal order of one or more labels including the first label of the geometric attribute associated with the object, the second label of the geometric attribute associated with the vehicle, the third label of the environmental attribute, or the fourth label of the classification of the object.

D: The system of paragraph B, wherein the individual driving sequence is further determined based on a combined sequence of data including: a first sub-sequence of data including a first temporal portion of the log data associated with a first order of one or more labels; and a second sub-sequence of data including second temporal portion of the log data associated with a second order of one or more labels.

E: The system of paragraph A, the operations further comprising: receiving a metrics inquiry associated with the first driving sequence; in response to receiving the metrics inquiry, determining at least one of a number of instances of the first driving sequence, a ratio of a duration of the first driving sequence to a whole duration the vehicle traversed, or a ratio of a number of miles associated with the first driving sequence for the vehicle to a number of total miles traversed by the vehicle; and generating a metric indicative of at least one of the number of instances of the first driving sequence, the ratio of the duration of the first driving sequence to the whole duration the vehicle traversed, or the ratio of the number of miles associated with the first driving sequence for the vehicle to the number of total miles traversed by the vehicle.

F: The system of paragraph A, the operations further comprising updating the predetermined driving sequences by: presenting, via a user interface, a catalog, the catalog including the predetermined driving sequences, an individual predetermined driving sequence being presented with one or more selectable fields, an individual selectable field of the one or more selectable fields including one or more options; receiving, via the user interface, a selection associated with the individual selectable field; and updating the predetermined driving sequences based at least in part on the selection.

G: A method comprising: receiving log data associated with a vehicle in an environment, the log data including at least one of location data, state data, or prediction data; identifying, using a set of rules, a sequence of data in the log data as corresponding to a driving sequence involving the vehicle in the environment; associating an identification of the driving sequence with the sequence of data in a database; receiving an inquiry for retrieving the sequence of data or information associated with the driving sequence; and in response to the inquiry, returning the sequence of data or information associated with the driving sequence.

H: The method of paragraph G, wherein the set of rules is determined based on predetermined driving sequences, an individual driving sequence of the predetermined driving sequences being determined based on at least one of a first label of a geometric attribute associated with the object, a second label of a geometric attribute associated with the vehicle, a third label of an environmental attribute, or a fourth label of a classification of an object.

I: The method of paragraph H, wherein the individual driving sequence is further determined based on a temporal order of one or more labels including the first label of the geometric attribute associated with the object, the second label of the geometric attribute associated with the vehicle, the third label of the environmental attribute, or the fourth label of the classification of the object.

J: The method of paragraph H, wherein the individual driving sequence is further determined based on a combined sequence of data including: a first sub-sequence of data including a first temporal portion of the log data associated with a first order of one or more labels; and a second sub-sequence of data including second temporal portion of the log data associated with a second order of one or more labels.

K: The method of paragraph J, wherein the first sub-sequence of data includes one or more ticks of data ordered in time representing at least one of a geometric attribute associated with the object, a geometric attribute associated with the vehicle, an environmental attribute, or a classification of the object.

L: The method of paragraph G, further comprising: receiving a metrics inquiry associated with the driving sequence; in response to receiving the metrics inquiry, determining at least one of a number of instances of the driving sequence, a ratio of a duration of the driving sequence to a whole duration the vehicle traversed, or a ratio of a number of miles associated with the driving sequence for the vehicle to a number of total miles traversed by the vehicle; and generating a metric indicative of at least one of the number of instances of the driving sequence, the ratio of the duration of the driving sequence to the whole duration the vehicle traversed, or the ratio of the number of miles associated with the driving sequence for the vehicle to the number of total miles traversed by the vehicle.

M: The method of paragraph G, further comprising updating the predetermined driving sequences by: presenting, via a user interface, a catalog, the catalog including the predetermined driving sequences, an individual predetermined driving sequence being presented with one or more selectable fields, an individual selectable field of the one or more selectable fields including one or more options; receiving, via the user interface, a selection associated with the individual selectable field; and updating the predetermined driving sequences based at least in part on the selection.

N: A non transitory computer readable medium storing instructions executable by a processor, wherein the instructions, when executed, cause the processor to perform operations comprising: receiving log data associated with a vehicle in an environment, the log data including at least one of location data, state data, or prediction data; identifying, using a set of rules, a sequence of data in the log data as corresponding to a driving sequence involving the vehicle in the environment; associating an identification of the driving sequence with the sequence of data in a database; receiving an inquiry for retrieving the sequence of data or information associated with the driving sequence; and in response to the inquiry, returning the sequence of data or information associated with the driving sequence.

O: The non transitory computer readable medium of paragraph N, wherein the set of rules is determined based on predetermined driving sequences, an individual driving sequence of the predetermined driving sequences being determined based on at least one of a first label of a geometric attribute associated with the object, a second label of a geometric attribute associated with the vehicle, a third label of an environmental attribute, or a fourth label of a classification of an object.

P: The non transitory computer readable medium of paragraph O, wherein the individual driving sequence is further determined based on a temporal order of one or more labels including the first label of the geometric attribute associated with the object, the second label of the geometric attribute associated with the vehicle, the third label of the environmental attribute, or the fourth label of the classification of the object.

Q: The non transitory computer readable medium of paragraph O, wherein the individual driving sequence is further determined based on a combined sequence of data including: a first sub-sequence of data including a first temporal portion of the log data associated with a first order of one or more labels; and a second sub-sequence of data including second temporal portion of the log data associated with a second order of one or more labels.

R: The non transitory computer readable medium of paragraph Q, wherein the first sub-sequence of data includes one or more ticks of data ordered in time representing at least one of a geometric attribute associated with the object, a geometric attribute associated with the vehicle, an environmental attribute, or a classification of the object.

S: The non transitory computer readable medium of paragraph N, the operations further comprising; receiving a metrics inquiry associated with the driving sequence; in response to receiving the metrics inquiry, determining at least one of a number of instances of the driving sequence, a ratio of a duration of the driving sequence to a whole duration the vehicle traversed, or a ratio of a number of miles associated with the driving sequence for the vehicle to a number of total miles traversed by the vehicle; and generating a metric indicative of at least one of the number of instances of the driving sequence, the ratio of the duration of the driving sequence to the whole duration the vehicle traversed, or the ratio of the number of miles associated with the driving sequence for the vehicle to the number of total miles traversed by the vehicle.

T: The non transitory computer readable medium of paragraph N, the operations further comprising updating the predetermined driving sequences by: presenting, via a user interface, a catalog, the catalog including the predetermined driving sequences, an individual predetermined driving sequence being presented with one or more selectable fields, an individual selectable field of the one or more selectable fields including one or more options; receiving, via the user interface, a selection associated with the individual selectable field; and updating the predetermined driving sequences based at least in part on the selection.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

What is claimed is:

1. A system comprising:
   one or more processors; and
   one or more non-transitory computer-readable media storing instructions that, when executed by the one or more processors, cause the one or more processors to perform operations comprising:
   receiving log data associated with a vehicle in an environment, the log data including information about the vehicle and information about an object in the environment in which the vehicle is operating, the log data including at least one of location data, state data, or prediction data;
   receiving a catalog of predetermined driving sequences, wherein an individual driving sequence of the predetermined driving sequences comprises conditions satisfying at least a first attribute associated with the individual driving sequence and satisfying at least a second attribute associated with the individual driving sequence, the first and second attribute including at least one of:
   a geometric attribute associated with the object,
   a geometric attribute associated with the vehicle,
   an environmental attribute, or
   a classification of the object;
   associating, based at least in part on a first sequence of data in the log data satisfying the first attribute and the second attribute of a first driving sequence of the predetermined driving sequences, the first sequence of data in the log data with the first driving sequence of the predetermined driving sequences;
   storing, based at least in part on associating the first sequence of data with the first driving sequence, a first association indicating the first sequence of data and the first driving sequence;
   associating, based at least in part on a second sequence of data in the log data satisfying the first attribute and the second attribute of a second driving sequence of the predetermined driving sequences, the second sequence of data in the log data with the second driving sequence of the predetermined driving sequences;
   receiving an inquiry for retrieving data associated with the first driving sequence or the second driving sequence, wherein the inquiry comprises an indication of a selection of a predetermined driving sequence from the catalog of predetermined driving sequences; and
   in response to receiving the inquiry, retrieving the first sequence of data or the second sequence of data.

2. The system of claim 1, wherein the individual driving sequence of the predetermined driving sequences is determined based at least in part on at least one of a first label of the geometric attribute associated with the object, a second label of the geometric attribute associated with the vehicle, a third label of the environmental attribute, or a fourth label of the classification of the object.

3. The system of claim 2, wherein the individual driving sequence is further determined based on a temporal order of one or more labels including the first label of the geometric attribute associated with the object, the second label of the geometric attribute associated with the vehicle, the third label of the environmental attribute, or the fourth label of the classification of the object.

4. The system of claim 2, wherein the individual driving sequence is further determined based on a combined sequence of data including:
   a first sub-sequence of data including a first temporal portion of the log data associated with a first order of one or more labels; and
   a second sub-sequence of data including second temporal portion of the log data associated with a second order of one or more labels.

5. The system of claim 1, the operations further comprising:
   receiving a metrics inquiry associated with the first driving sequence;
   in response to receiving the metrics inquiry, determining at least one of a number of instances of the first driving sequence, a ratio of a duration of the first driving sequence to a whole duration the vehicle traversed, or a ratio of a number of miles associated with the first driving sequence for the vehicle to a number of total miles traversed by the vehicle; and
   generating a metric indicative of at least one of the number of instances of the first driving sequence, the ratio of the duration of the first driving sequence to the whole duration the vehicle traversed, or the ratio of the number of miles associated with the first driving sequence for the vehicle to the number of total miles traversed by the vehicle.

6. The system of claim 1, the operations further comprising updating the predetermined driving sequences by:
presenting, via a user interface, the catalog including the predetermined driving sequences, an individual predetermined driving sequence being presented with one or more selectable fields, an individual selectable field of the one or more selectable fields including one or more options;
receiving, via the user interface, a selection associated with the individual selectable field; and
updating the predetermined driving sequences based at least in part on the selection.

7. A method comprising:
receiving log data associated with a vehicle in an environment, the log data including at least one of location data, state data, or prediction data;
receiving a catalog of predetermined driving sequences, wherein an individual driving sequence of the predetermined driving sequences comprises conditions satisfying at least a first attribute associated with the individual driving sequence and satisfying at least a second attribute associated with the individual driving sequence, the first and second attribute including at least one of:
a geometric attribute associated with an object in the environment,
a geometric attribute associated with the vehicle,
an environmental attribute, or
a classification of the object;
identifying, using the first attribute and the second attribute, a sequence of data in the log data as corresponding to the individual driving sequence involving the vehicle in the environment;
associating an identification of the driving sequence with the sequence of data in a database;
receiving an inquiry for retrieving the sequence of data or information associated with the driving sequence, wherein the inquiry comprises an indication of a selection of a predetermined driving sequence from the catalog of predetermined driving sequences; and
in response to the inquiry, returning the sequence of data or information associated with the driving sequence.

8. The method of claim 7, wherein the individual driving sequence of the predetermined driving sequences is determined based on at least one of a first label of the geometric attribute associated with the object, a second label of the geometric attribute associated with the vehicle, a third label of the environmental attribute, or a fourth label of the classification of the object.

9. The method of claim 8, wherein the individual driving sequence is further determined based on a temporal order of one or more labels including the first label of the geometric attribute associated with the object, the second label of the geometric attribute associated with the vehicle, the third label of the environmental attribute, or the fourth label of the classification of the object.

10. The method of claim 8, wherein the individual driving sequence is further determined based on a combined sequence of data including:
a first sub-sequence of data including a first temporal portion of the log data associated with a first order of one or more labels; and
a second sub-sequence of data including second temporal portion of the log data associated with a second order of one or more labels.

11. The method of claim 10, wherein the first sub-sequence of data includes one or more ticks of data ordered in time representing at least one of the geometric attribute associated with the object, the geometric attribute associated with the vehicle, the environmental attribute, or the classification of the object.

12. The method of claim 7, further comprising:
receiving a metrics inquiry associated with the driving sequence;
in response to receiving the metrics inquiry, determining at least one of a number of instances of the driving sequence, a ratio of a duration of the driving sequence to a whole duration the vehicle traversed, or a ratio of a number of miles associated with the driving sequence for the vehicle to a number of total miles traversed by the vehicle; and
generating a metric indicative of at least one of the number of instances of the driving sequence, the ratio of the duration of the driving sequence to the whole duration the vehicle traversed, or the ratio of the number of miles associated with the driving sequence for the vehicle to the number of total miles traversed by the vehicle.

13. The method of claim 7, further comprising updating the predetermined driving sequences by:
presenting, via a user interface, the catalog including the predetermined driving sequences, an individual predetermined driving sequence being presented with one or more selectable fields, an individual selectable field of the one or more selectable fields including one or more options;
receiving, via the user interface, a selection associated with the individual selectable field; and
updating the predetermined driving sequences based at least in part on the selection.

14. A non transitory computer readable medium storing instructions executable by a processor, wherein the instructions, when executed, cause the processor to perform operations comprising:
receiving log data associated with a vehicle in an environment, the log data including at least one of location data, state data, or prediction data;
receiving a catalog of predetermined driving sequences, wherein individual driving sequences of the predetermined driving sequences comprise conditions describing satisfying at least a first attribute associated with the individual driving sequence and satisfying at least a second attribute associated with the individual driving sequence, the first and second attribute including at least one of:
a geometric attribute associated with an object in the environment,
a geometric attribute associated with the vehicle,
an environmental attribute, or
a classification of the object;
identifying, using the first attribute and the second attribute of a driving sequence of the predetermined driving sequences, a sequence of data in the log data as corresponding to the driving sequence involving the vehicle in the environment;
associating an identification of the driving sequence with the sequence of data in a database;
receiving an inquiry for retrieving the sequence of data or information associated with the driving sequence, wherein the inquiry comprises an indication of a selection of a predetermined driving sequence from the catalog of predetermined driving sequences; and in response to the inquiry, returning the sequence of data or information associated with the driving sequence.

15. The non transitory computer readable medium of claim 14, wherein the individual driving sequence of the predetermined driving sequences is determined based on at least one of a first label of the geometric attribute associated with the object, a second label of the geometric attribute associated with the vehicle, a third label of the environmental attribute, or a fourth label of the classification of the object.

16. The non transitory computer readable medium of claim 15, wherein the individual driving sequence is further determined based on a temporal order of one or more labels including the first label of the geometric attribute associated with the object, the second label of the geometric attribute associated with the vehicle, the third label of the environmental attribute, or the fourth label of the classification of the object.

17. The non transitory computer readable medium of claim 15, wherein the individual driving sequence is further determined based on a combined sequence of data including:
   a first sub-sequence of data including a first temporal portion of the log data associated with a first order of one or more labels; and
   a second sub-sequence of data including second temporal portion of the log data associated with a second order of one or more labels.

18. The non transitory computer readable medium of claim 17, wherein the first sub-sequence of data includes one or more ticks of data ordered in time representing at least one of the geometric attribute associated with the object, the geometric attribute associated with the vehicle, the environmental attribute, or the classification of the object.

19. The non transitory computer readable medium of claim 14, the operations further comprising;
   receiving a metrics inquiry associated with the driving sequence;
   in response to receiving the metrics inquiry, determining at least one of a number of instances of the driving sequence, a ratio of a duration of the driving sequence to a whole duration the vehicle traversed, or a ratio of a number of miles associated with the driving sequence for the vehicle to a number of total miles traversed by the vehicle; and
   generating a metric indicative of at least one of the number of instances of the driving sequence, the ratio of the duration of the driving sequence to the whole duration the vehicle traversed, or the ratio of the number of miles associated with the driving sequence for the vehicle to the number of total miles traversed by the vehicle.

20. The non transitory computer readable medium of claim 14, the operations further comprising updating the predetermined driving sequences by:
   presenting, via a user interface, a catalog, the catalog including the predetermined driving sequences, an individual predetermined driving sequence being presented with one or more selectable fields, an individual selectable field of the one or more selectable fields including one or more options;
   receiving, via the user interface, a selection associated with the individual selectable field; and
   updating the predetermined driving sequences based at least in part on the selection.

* * * * *